United States Patent
Takagi et al.

(10) Patent No.: US 8,294,829 B2
(45) Date of Patent: Oct. 23, 2012

(54) TELEVISION RECEIVER, CHANNEL TUNING METHOD FOR AUTOMATICALLY UPDATING CHANNEL DATA AND CHANNEL SCAN METHOD FOR MORE RAPID AND RELIABLE CHANNEL SCANNING

(75) Inventors: Toshihiro Takagi, Daito (JP); Yasuhiro Inui, Daito (JP); Kenji Okamoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1237 days.

(21) Appl. No.: 11/701,451

(22) Filed: Feb. 2, 2007

(65) Prior Publication Data

US 2007/0186262 A1  Aug. 9, 2007

(30) Foreign Application Priority Data

Feb. 3, 2006 (JP) ................................. 2006-027084

(51) Int. Cl.
*H04N 5/50* (2006.01)
*H04N 7/16* (2006.01)

(52) U.S. Cl. ...................................... 348/732; 725/151
(58) Field of Classification Search .................. 348/731, 348/732; 725/1–153
See application file for complete search history.

(56) References Cited

U.S. PATENT DOCUMENTS

| | | | | |
|---|---|---|---|---|
| 5,087,977 A | * | 2/1992 | Suizu | 348/732 |
| 5,659,352 A | * | 8/1997 | Lee | 725/151 |
| 6,864,926 B2 | * | 3/2005 | Ohmatsu | 348/731 |
| 7,380,263 B2 | * | 5/2008 | Shintani | 725/59 |
| 7,603,077 B2 | | 10/2009 | Onomatsu et al. | |
| 2003/0007572 A1 | | 1/2003 | Ohmatsu | |
| 2004/0244048 A1 | * | 12/2004 | Wada et al. | 725/120 |
| 2006/0061694 A1 | * | 3/2006 | Oh | 348/732 |

FOREIGN PATENT DOCUMENTS

| | | |
|---|---|---|
| JP | 2000-115005 A | 4/2000 |
| JP | 2001-145130 A | 5/2001 |
| JP | 3077432 U | 5/2001 |
| JP | 2001-339651 A | 12/2001 |
| JP | 2003-230060 A | 8/2003 |
| JP | 2004-363660 A | 12/2004 |
| JP | 2005-94555 A | 4/2005 |
| JP | 2006-13943 A | 1/2006 |

OTHER PUBLICATIONS

Japanese Office Action dated Mar. 29, 2011 with English translation (six (6) pages).
Japanese Office Action dated Jul. 19, 2011 with English translation (five (5) pages).

* cited by examiner

*Primary Examiner* — Bennett A Ingvoldstad
(74) *Attorney, Agent, or Firm* — Crowell & Moring LLP

(57) ABSTRACT

A television receiver including: a reception control unit which judges whether reception of the cable television broadcast signal has succeeded, by setting the channel data composed of the combination of the frequency table stored in the first storage unit and the modulation method stored in the second storage unit, the modulation method corresponding to the tuned channel. The reception control unit sequentially changes the channel data to be set in a previously determined order to make the reception unit receive the cable television broadcast signal corresponding to the tuned channel when the reception control unit judges that the reception of the cable television broadcast signal has not succeeded.

5 Claims, 16 Drawing Sheets

173

| SUCCESS CHANNEL DATA || SUCCESS NUMBER | ... |
|---|---|---|---|
| MODULATION METHOD | FREQUENCY TABLE | | |
| 8VSB | STD | 0 | ... |
| 8VSB | HRC | 0 | ... |
| 64QAM | STD | 0 | ... |
| 64QAM | HRC | 0 | ... |
| 256QAM | STD | 0 | ... |
| 256QAM | HRC | 0 | ... |

|  | STD | IRC | HRC |
|---|---|---|---|
| VSB | LEC +0.31 | LEC +0.31 | LEC -0.94 |
| QAM | LEC +3 | LEC +3 | LEC +1.75 |

| LAST CHANNEL DATA | | TERRESTRIAL/ CABLE DISCRIMINATION FLAG | ... |
|---|---|---|---|
| LAST MODULATION | LAST FREQ TABLE | | |
| 256QAM | STD | TERRESTRIAL | ... |

171a, 171b

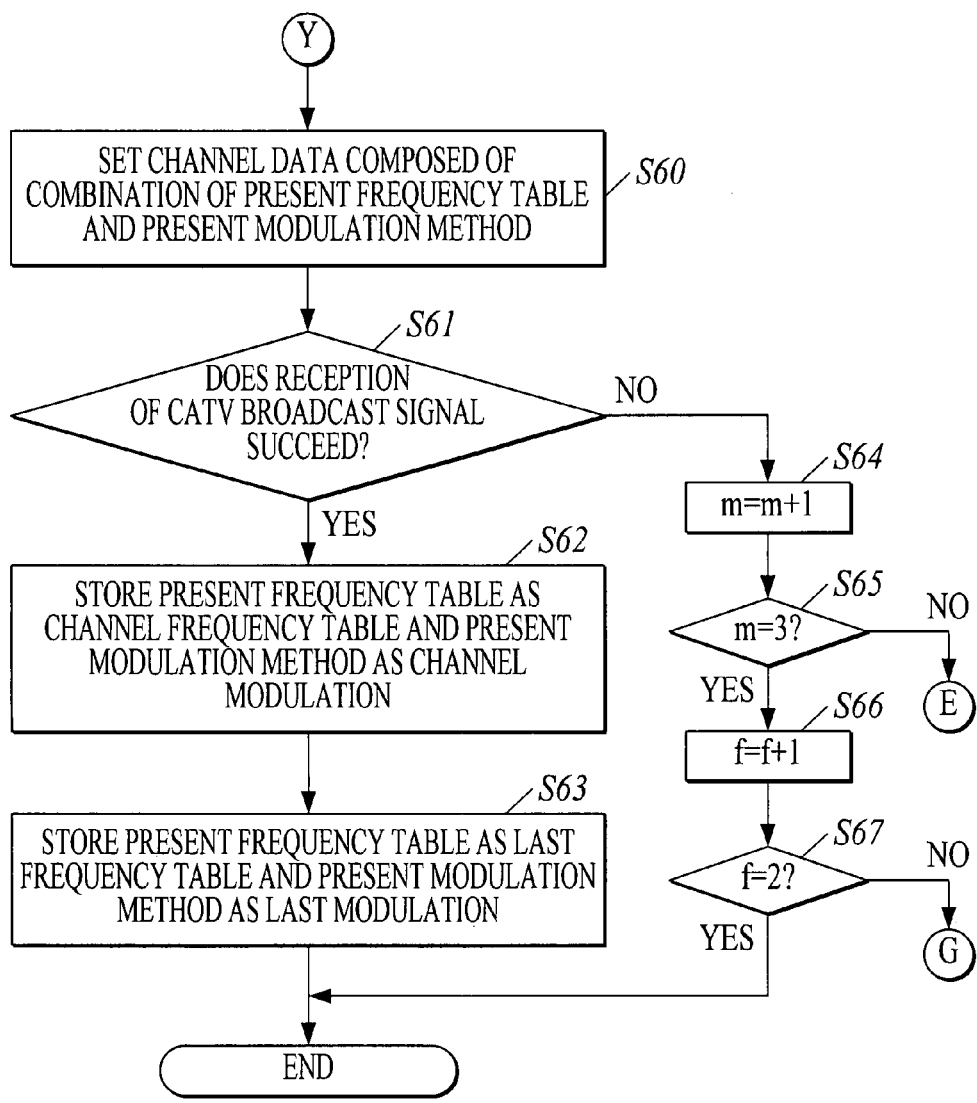

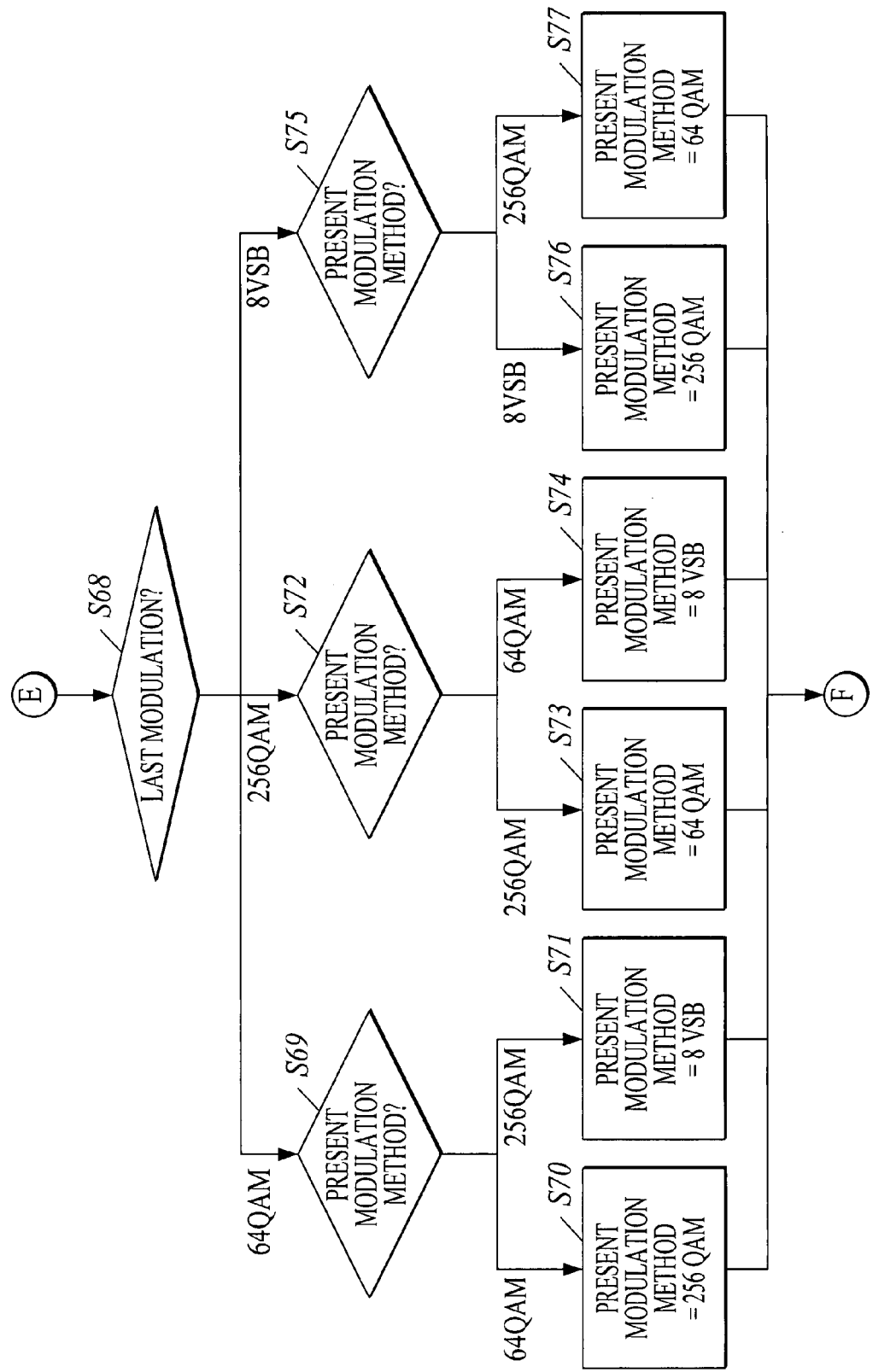

TELEVISION RECEIVER, CHANNEL TUNING METHOD FOR AUTOMATICALLY UPDATING CHANNEL DATA AND CHANNEL SCAN METHOD FOR MORE RAPID AND RELIABLE CHANNEL SCANNING

BACKGROUND OF THE INVENTION

1. Field of the Invention

The present invention relates to a television receiver, a channel tuning method and a channel scan method.

2. Related Art

There is known a television receiver capable of receiving television broadcast signals (hereinafter referred to as "TV broadcast signals") of terrestrial digital broadcasting and cable television (hereinafter referred to as "CATV") digital broadcasting (see, for example, Patent Document 1).

In such a television receiver, it is necessary to preset the channel data of a TV broadcast signal in advance by, for example, performing the auto scan of channels in the order of channels (physical channels) as default in order to rapidly receive the TV broadcast signal corresponding to the channel tuned by a user for example.

For example, a broadcasting station of terrestrial digital broadcasting in USA transmits only the TV broadcast signals modulated by a kind of a modulation method (8-level vestigial side band (VSB) modulation method). Consequently, in the case of a TV broadcast signal of the terrestrial digital broadcasting (hereinafter referred to as a "terrestrial TV broadcast signal"), channel data can be preset only by, for example, scanning channels and by judging whether the reception of a terrestrial TV broadcast signal has succeeded or not.

On the other hand, a broadcasting station of the CATV digital broadcasting in USA transmits a TV broadcast signal modulated by any one of three kinds of modulation methods (8 VSB modulation method, 64 quadrature amplitude modulation (QAM) method and 256 QAM method) using any one of three kinds of frequency tables (standard frequency (STD) table, incremental related carrier (IRC) table and harmonic related carrier (HRC) table). Consequently, in the case of a TV broadcast signal of the CATV digital broadcasting (a cable television broadcast signal (hereinafter referred to as a "CATV broadcast signal")), channel data cannot be preset without judging whether the reception of the CATV broadcast signal has succeeded or not by severally setting, for example, nine kinds of combinations obtained by multiplying the three kinds of modulation methods by the three kinds of frequency tables, and by scanning channels to each of the setting.

That is, it takes a longer time to preset the channel data of the CATV broadcast signal in comparison with the time necessary to preset the channel data of the terrestrial TV broadcast signal.

Accordingly, various methods have been proposed in order to preset the channel data of the CATV broadcast signal in a shorter time.

To put it concretely, one proposed method sets the frequency tables in the descending order from the frequency table that is most frequently adopted in the CATV broadcasting (the order of the STD table, the IRC table and the HRC table), and judges the setting by which the CATV broadcast signal corresponding to one channel can be received. Then, the method scans the other channels in the judged setting, and judges whether the CATV broadcast signal can be received or not. Thereby, the method presets the channel data in a television receiver for the CATV digital broadcasting (see, for example, Patent Document 2). Another method presets channel data by using the fact that the probability that the combination of the frequency table and the modulation method of the CATV broadcast signal corresponding to one channel and the combination of the frequency table and the modulation method of the CATV broadcast signal corresponding to another channel are the same is high in one transmission band (one band among five bands obtained by dividing the band of the CATV digital broadcasting into the five ones) because the frequency bands of adjoining channels adjoin each other without any gaps, or by using the fact that the probability that the combination of the frequency table and the modulation method of the CATV broadcast signal corresponding to one channel in one transmission band and the combination of the frequency table and the modulation method of the CATV broadcast signal corresponding to the other channel in the other transmission band are the same is high in adjoining transmission bands because the frequency bands of adjoining channels adjoin each other without any gaps (see, for example, Patent Document 3). These and other methods have been proposed.

[Patent Document 1] JP-A-2005-94555
[Patent Document 2] JP-A-2004-363660
[Patent Document 3] JP-A-2003-230060

However, for example, the method disclosed in the Patent Document 2 cannot preset the channel data of the CATV broadcast signal corresponding to another channel unless the frequency table of the CATV broadcast signal corresponding to one channel and the frequency table of the CATV broadcast signal corresponding to the other channel are the same.

Moreover, for example, the method disclosed in the Patent Document 3 cannot preset channel data unless it is judged whether the reception of the CATV broadcast signal has succeeded or not by setting each of the nine kinds of combinations when the combinations of the frequency tables and the modulation methods are not the same in one transmission band, or when the combinations of the frequency tables and the modulation methods of adjoining transmission bands are not the same.

Moreover, the methods disclosed in the Patent Documents 2 and 3 cannot surely and rapidly perform the channel tuning of a television receiver at the time of a normal operation when channel data has been changed or the like.

SUMMARY OF THE INVENTION

It is an object of the present invention to provide a television receiver, a channel tuning method and a channel scan method that can surely and rapidly determine the channel data of a television broadcast signal of the cable television digital broadcasting.

In order to solve the above problem, in accordance with a first aspect of the invention, the television receiver comprises: a reception unit to receive a cable television broadcast signal of a digital system; an auto scan unit to perform setting channel data composed of a combination of a frequency table and a modulation method of the cable television broadcast signal received by the reception unit to each channel at a predetermined timing; an auto scan storage unit to store the channel data composed of the combination of the frequency table and the modulation method of the cable television broadcast signal received by the reception unit in a channel tuned in just before at a time of an auto scan of the auto scan unit; an auto scan reception control unit to set the channel data stored in the auto scan storage unit as channel data of a cable television broadcast signal corresponding to a tuned channel to make the reception unit receive the cable television broadcast signal corresponding to the tuned channel when the channel is tuned in by the auto scan unit, and to subsequently judge whether reception of the cable television broadcast signal has succeeded or not, the auto scan reception control unit sequentially changing channel data to be set in a previously determined order to make the reception unit receive the cable television broadcast signal corresponding to the tuned channel when the auto scan reception control unit judges that the reception of the auto cable television broadcast signal has not succeeded, the auto scan reception control unit subsequently updating the channel data stored in the auto scan storage unit to channel data set at a time of a success when the auto scan reception control unit judges that the reception of the cable television broadcast signal has succeeded; a first storage unit to store the frequency table of the cable television broadcast signal received by the reception unit in the channel tuned in just before; a second storage unit to store the modulation method of the cable television broadcast signal received by the reception unit of each channel obtained by the auto scan unit; a tuning unit to tune in the channel; and a reception control unit to set the channel data composed of the combination of the frequency table stored in the first storage unit and the modulation method stored in the second storage unit, the modulation method corresponding to the tuned channel, as the channel data of the cable television broadcast signal corresponding to the tuned channel when the channel is tuned in by the tuning unit to make the reception unit receive the cable television broadcast signal corresponding to the tuned channel, wherein the reception control unit judges whether the reception of the cable television broadcast signal has succeeded or not by setting the channel data composed of the combination of the frequency table stored in the first storage unit and the modulation method stored in the second storage unit, the modulation method corresponding to the tuned channel, and subsequently, the reception control unit sequentially changes the channel data to be set in the previously determined order to make the reception unit receive the cable television broadcast signal corresponding to the tuned channel when the reception control unit judges that the reception of the cable television broadcast signal has not succeeded, and subsequently, the reception control unit updates the frequency table stored in the first storage unit and the modulation method stored in the second storage unit, the modulation method corresponding to the tuned channel, to the frequency table and the modulation method that are included in the channel data set at the time of the success, respectively, when the reception control unit judges that the reception of the cable television broadcast signal has succeeded.

According to a first aspect of the present invention, the auto scan unit is provided with the auto scan reception control unit to set the channel data stored in the auto scan storage unit as the channel data of the cable television broadcast signal corresponding to the tuned channel when the channel is tuned in, and to make the reception unit receive the cable television broadcast signal corresponding to the tuned channel.

That is, because the frequency bands of adjoining channels adjoin each other without any gaps, the channel data of the cable television broadcast signal corresponding to the tuned channel can be set using the fact that the probability that the combination (channel data) of the frequency table and the modulation method of the cable television broadcast signal corresponding to the channel and the combination (channel data) of the frequency table and the modulation method of the cable television broadcast signal corresponding to the channel adjoining the former channel are the same is high. Consequently, the channel data of the television broadcast signal of the cable television digital broadcasting can be surely and rapidly determined.

Moreover, the auto scan reception control unit judges whether the reception of the cable television broadcast signal has succeeded or not by setting the channel data stored in the auto scan storage unit. When the auto scan reception control unit judges that the reception of the cable television broadcast signal has not succeeded, the auto scan reception control unit sequentially changes the channel data to be set in the previously determined order, and makes the reception unit receive the cable television broadcast signal corresponding to the tuned channel. Subsequently, when the auto scan reception control unit judges that the reception of the cable television broadcast signal has succeeded, the auto scan reception control unit can update the channel data stored in the auto scan storage unit to the channel data that has been set at the time of the success.

That is, if the channel data of the cable television broadcast signals corresponding to the adjoining channels are not the same, the channel data to be set can be changed in the previously determined order (for example, the order of the channel data that is most frequently adopted in the cable television broadcasting). Consequently, even if the channel data of the cable television broadcast signals corresponding to the adjoining channels are not the same, the channel data of the television broadcast signal of the cable television digital broadcasting can be surely and rapidly determined.

Moreover, when the channel is tuned in by the tuning unit, it is possible for the reception control unit to set the channel data composed of the combination of the frequency table stored in the first storage unit and the modulation method that is stored in the second storage unit and corresponds to the tuned channel as the channel data of the cable television broadcast signal corresponding to the tuned channel, and to make the reception unit receive the cable television broadcast signal corresponding to the tuned channel. Then, the reception control unit judges whether the reception of the cable television broadcast signal has succeeded or not by setting the channel data composed of the combination of the frequency table stored in the first storage unit and the modulation method that is stored in the second storage unit and corresponds to the tuned channel. When the reception control unit judges that the reception of the cable television broadcast signal has not succeeded, the reception control unit sequentially changes the channel data to be set in the previously determined order to make the reception unit receive the cable television broadcast signal corresponding to the tuned channel. Subsequently, when the reception control unit judges that the reception of the cable television broadcast signal has succeeded, the reception control unit can update the frequency table stored in the first storage unit and the modulation method that is stored in the second storage unit and corresponds to the tuned channel to the frequency table and the modulation method that are included in the channel data set at the time of the success, respectively.

That is, when the reception of the cable television broadcast signal has not succeeded, the channel data to be set can be changed in the previously determined order (for example, the order of the channel data that is most frequently adopted in the cable television broadcasting) by setting the channel data composed of the combination of the frequency table stored in the first storage unit and the modulation method stored in the second storage unit. Consequently, the channel data of the television broadcast signal of the cable television digital broadcasting can be surely and rapidly determined.

In accordance with a second aspect of the invention, the television receiver comprises: a reception unit to receive a cable television broadcast signal; a first storage unit to store a frequency table of the cable television broadcast signal received by the reception unit in a channel tuned in just before; a second storage unit to store a modulation method of the cable television broadcast signal received by the reception unit in each of channels obtained by auto scans; a tuning unit to tune in a channel; and a reception control unit to set channel data composed of a combination of the frequency table stored in the first storage unit and the modulation method stored in the second storage unit, the modulation method corresponding to the tuned channel, as channel data of a cable television broadcast signal corresponding to the tuned channel when the channel is tuned in by the tuning unit, and to make the reception unit receive the cable television broadcast signal corresponding to the tuned channel, wherein the reception control unit judges whether reception of the cable television broadcast signal has succeeded or not by setting the channel data composed of the combination of the frequency table stored in the first storage unit and the modulation method stored in the second storage unit, the modulation method corresponding to the tuned channel, and the reception control unit sequentially changes the channel data to be set in a previously determined order to make the reception unit receive the cable television broadcast signal corresponding to the tuned channel when the reception control unit judges that the reception of the cable television broadcast signal has not succeeded, and subsequently, the reception control unit updates the frequency table stored in the first storage unit and the modulation method stored in the second storage unit, the modulation method corresponding to the tuned channel, to the frequency table and the modulation method that are included in the channel data set at a time of the success, respectively, when the reception control unit judges that the reception of the cable television broadcast signal has succeeded.

According to the second aspect of the present invention, when the channel is tuned by the tuning unit, it is possible for the reception control unit to set the channel data composed of the combination of the frequency table stored in the first storage unit and the modulation method that is stored in the second storage unit and corresponds to the tuned channel as the channel data of the cable television broadcast signal corresponding to the tuned channel, and to make the reception unit receive the cable television broadcast signal corresponding to the tuned channel. Then, the reception control unit judges whether the reception of the cable television broadcast signal has succeeded or not by setting the channel data composed of the combination of the frequency table stored in the first storage unit and the modulation method that is stored in the second storage unit and corresponds to the tuned channel. When the reception control unit judges that the reception of the cable television broadcast signal has not succeeded, the reception control unit sequentially changes the channel data to be set in the previously determined order to make the reception unit receive the cable television broadcast signal corresponding to the tuned channel. Subsequently, when the reception control unit judges that the reception of the cable television broadcast signal has succeeded, the reception control unit can update the frequency table stored in the first storage unit and the modulation method that is stored in the second storage unit and corresponds to the tuned channel to the frequency table and the modulation method that are included in the channel data set at the time of the success, respectively.

That is, when the reception of the cable television broadcast signal has not succeeded, the channel data to be set can be changed in the previously determined order (for example, the order of the channel data that is most frequently adopted in the cable television broadcasting) by setting the channel data composed of the combination of the frequency table stored in the first storage unit and the modulation method stored in the second storage unit. Consequently, the channel data of the television broadcast signal of the cable television digital broadcasting can be surely and rapidly determined.

Preferably, the television receiver further comprises a success number storage unit to store a success number of the reception of the cable television broadcast signals to each channel data, wherein the reception control unit changes and sets the channel data in a descending order of channel data from that having a largest success number stored in the success number storage unit.

According to the television receiver having such a configuration, it is not only needless to say that the similar advantages to those of the second aspect of the present invention can be obtained, but also the reception control unit can change and set the channel data in the descending order from that having the largest success number stored in the success number storage unit.

That is, because the previously determined order is the descending order from the channel data having the largest success number, the channel data of the television broadcast signal of the cable television digital broadcasting can be more surely and rapidly determined.

In accordance with a third aspect of the invention, the television receiver comprises: a reception unit to receive a cable television broadcast signal; an auto scan unit to perform setting channel data composed of a combination of a frequency table and a modulation method of the cable television broadcast signal received by the reception unit to each channel at a predetermined timing; and an auto scan storage unit to store the channel data composed of the combination of the frequency table and the modulation method of the cable television broadcast signal received by the reception unit in a channel tuned in just before at a time of an auto scan of the auto scan unit, wherein the auto scan unit is provided with an auto scan reception control unit to set the channel data stored in the auto scan storage unit as channel data of a cable television broadcast signal corresponding to a tuned channel to make the reception unit receive the cable television broadcast signal corresponding to the tuned channel when the channel is tuned in, wherein the auto scan reception control unit judges whether reception of the cable television broadcast signal has succeeded or not by setting the channel data stored in the auto scan storage unit, the auto scan reception control unit sequentially changing channel data to be set in a previously determined order to make the reception unit receive the cable television broadcast signal corresponding to the tuned channel when the auto scan reception control unit judges that the reception of the cable television broadcast signal has not succeeded, the auto scan reception control unit subsequently updating the channel data stored in the auto scan storage unit to channel data set at a time of a success when the auto scan reception control unit judges that the reception of the cable television broadcast signal has succeeded.

According to the third aspect of the invention, the auto scan unit is provided with the auto scan reception control unit to set the channel data stored in the auto scan storage unit as the channel data of the cable television broadcast signal corresponding to the tuned channel and to make the reception unit receive the cable television broadcast signal corresponding to the tuned channel when the channel is tuned in.

That is, because the frequency bands of adjoining channels adjoin each other without any gaps, it is possible to set the channel data of the cable television broadcast signal corresponding to the tuned channel by using the fact that the probability that the combination (channel data) of the frequency table and the modulation method of the cable television broadcast signal corresponding to the channel and the combination (channel data) of the frequency table and the modulation method of the cable television broadcast signal corresponding to the channel adjoining the former channel are the same is high. Consequently, the channel data of the television broadcast signal of the cable television digital broadcasting can be surely and rapidly determined.

Moreover, the auto scan reception control unit judges whether the reception of the cable television broadcast signal has succeeded or not by setting the channel data stored in the auto scan storage unit. When the auto scan reception control unit judges that the reception of the cable television broadcast signal has not succeeded, the auto scan reception control unit sequentially changes the channel data to be set in the previously determined order to make the reception unit receive the cable television broadcast signal corresponding to the tuned channel. Subsequently, when the auto scan reception control unit judges that the reception of the cable television broadcast signal has succeeded, the auto scan reception control unit can update the channel data stored in the auto scan storage unit to the channel data set at the success.

That is, when the reception of the cable television broadcast signal has not succeeded, the channel data to be set can be changed in the previously determined order (for example, the order of the channel data that is most frequently adopted in the cable television broadcasting) by setting the channel data stored in the auto scan storage unit. Consequently, even if the channel data of the cable television broadcast signals corresponding to adjoining channels is not the same, the channel data of the television broadcast signal of the cable television digital broadcasting can be surely and rapidly determined.

In accordance with a fourth aspect of the invention, the channel tuning method of the television receiver according to claim 2, comprises the steps of: tuning in a channel with the tuning unit; setting channel data composed of a combination of a frequency table stored in the first storage unit and a modulation method stored in the second storage unit, the modulation method corresponding to a tuned channel, as channel data of a cable television broadcast signal corresponding to the tuned channel to make the reception unit receive the cable television broadcast signal corresponding to the tuned channel with the reception control unit when the channel is tuned in at the step of tuning in the channel; judging whether reception of the cable television broadcast signal has succeeded or not at the step of setting the channel data with the reception control unit; sequentially changing channel data to be set in a previously determined order to make the reception unit receive the cable television broadcast signal corresponding to the tuned channel with the reception control unit when the reception of the cable television broadcast signal is judged not to have succeeded at the step of judging success of the reception; judging whether the reception of the cable television broadcast signal has succeeded or not with the reception control unit at the step of sequentially changing the channel data; and updating the frequency table stored in the first storage unit and the modulation method stored in the second storage unit, the modulation method corresponding to the tuned channel, to a frequency table and a modulation method that are included in the channel data set at the success, respectively, when the reception of the cable television broadcast signal is judged to have succeeded at the step of second judging of the success of the reception.

According to the fourth aspect of the present invention, when the channel is tuned by the tuning unit, it is possible for the reception control unit to set the channel data composed of the combination of the frequency table stored in the first storage unit and the modulation method that is stored in the second storage unit and corresponds to the tuned channel as the channel data of the cable television broadcast signal corresponding to the tuned channel, and to make the reception unit receive the cable television broadcast signal corresponding to the tuned channel. Then, the reception control unit judges whether the reception of the cable television broadcast signal has succeeded or not by setting the channel data composed of the combination of the frequency table stored in the first storage unit and the modulation method that is stored in the second storage unit and corresponds to the tuned channel. When the reception control unit judges that the reception of the cable television broadcast signal has not succeeded, the reception control unit sequentially changes the channel data to be set in the previously determined order to make the reception unit receive the cable television broadcast signal corresponding to the tuned channel. Subsequently, when the reception control unit judges that the reception of the cable television broadcast signal has succeeded, the reception control unit can update the frequency table stored in the first storage unit and the modulation method that is stored in the second storage unit and corresponds to the tuned channel to the frequency table and the modulation method that are included in the channel data set at the time of the success, respectively.

That is, when the reception of the cable television broadcast signal has not succeeded, the channel data to be set can be changed in the previously determined order (for example, the order of the channel data that is most frequently adopted in the cable television broadcasting) by setting the channel data composed of the combination of the frequency table stored in the first storage unit and the modulation method stored in the second storage unit. Consequently, the channel data of the television broadcast signal of the cable television digital broadcasting can be surely and rapidly determined.

In accordance with a fifth aspect of the invention, the channel scan method of the television receiver according to claim 4, comprises the steps of: setting channel data stored in the auto scan storage unit as channel data of a cable television broadcast signal corresponding to a tuned channel to make the reception unit receive the cable television broadcast signal corresponding to the tuned channel with the auto scan reception control unit when the channel is tuned in by the auto scan reception control unit during an auto scan; judging whether reception of the cable television broadcast signal has succeeded or not with the auto scan reception control unit at the step of setting the channel data; sequentially changing channel data to be set in a previously determined order to make the reception unit receive the cable television broadcast signal corresponding to the tuned channel with the auto scan reception control unit when the reception of the cable television broadcast signal is judged not to have succeeded at the step of judging the success of the reception; judging whether the reception of the cable television broadcast signal has succeeded or not with the auto scan reception control unit at the step of sequentially changing the channel data; and updating the channel data stored in the auto scan storage unit to channel data set at the success with the auto scan reception control unit when the reception of the cable television broadcast signal is judged to have succeeded at the step of the second judging of the success of the reception.

According to the fifth aspect of the invention, the auto scan unit is provided with the auto scan reception control unit to set the channel data stored in the auto scan storage unit as the channel data of the cable television broadcast signal corresponding to the tuned channel and to make the reception unit receive the cable television broadcast signal corresponding to the tuned channel when the channel is tuned in.

That is, because the frequency bands of adjoining channels adjoin each other without any gaps, it is possible to set the channel data of the cable television broadcast signal corresponding to the tuned channel by using the fact that the probability that the combination (channel data) of the frequency table and the modulation method of the cable television broadcast signal corresponding to the channel and the combination (channel data) of the frequency table and the modulation method of the cable television broadcast signal corresponding to the channel adjoining the former channel are the same is high. Consequently, the channel data of the television broadcast signal of the cable television digital broadcasting can be surely and rapidly determined.

Moreover, the auto scan reception control unit judges whether the reception of the cable television broadcast signal has succeeded or not by setting the channel data stored in the auto scan storage unit. When the auto scan reception control unit judges that the reception of the cable television broadcast signal has not succeeded, the auto scan reception control unit sequentially changes the channel data to be set in the previously determined order to make the reception unit receive the cable television broadcast signal corresponding to the tuned channel. Subsequently, when the auto scan reception control unit judges that the reception of the cable television broadcast signal has succeeded, the auto scan reception control unit can update the channel data stored in the auto scan storage unit to the channel data set at the success.

That is, when the reception of the cable television broadcast signal has not succeeded, the channel data to be set can be changed in the previously determined order (for example, the order of the channel data that is most frequently adopted in the cable television broadcasting) by setting the channel data stored in the auto scan storage unit. Consequently, even if the channel data of the cable television broadcast signals corresponding to adjoining channels is not the same, the channel data of the television broadcast signal of the cable television digital broadcasting can be surely and rapidly determined.

BRIEF DESCRIPTION OF THE DRAWINGS

FIG. 2 is a diagram for illustrating the value of the center frequency of the frequency band in which a cable television broadcast signal of the digital system corresponding to each channel exists;

FIG. 3 is a diagram showing the data structure of a last channel data table shown in FIG. 1;

FIG. 10 is a flow chart for illustrating second processing pertaining to the channel tuning by the television receiver according to the present invention;

DETAILED DESCRIPTION OF THE PREFERRED EMBODIMENTS

Figure 1:
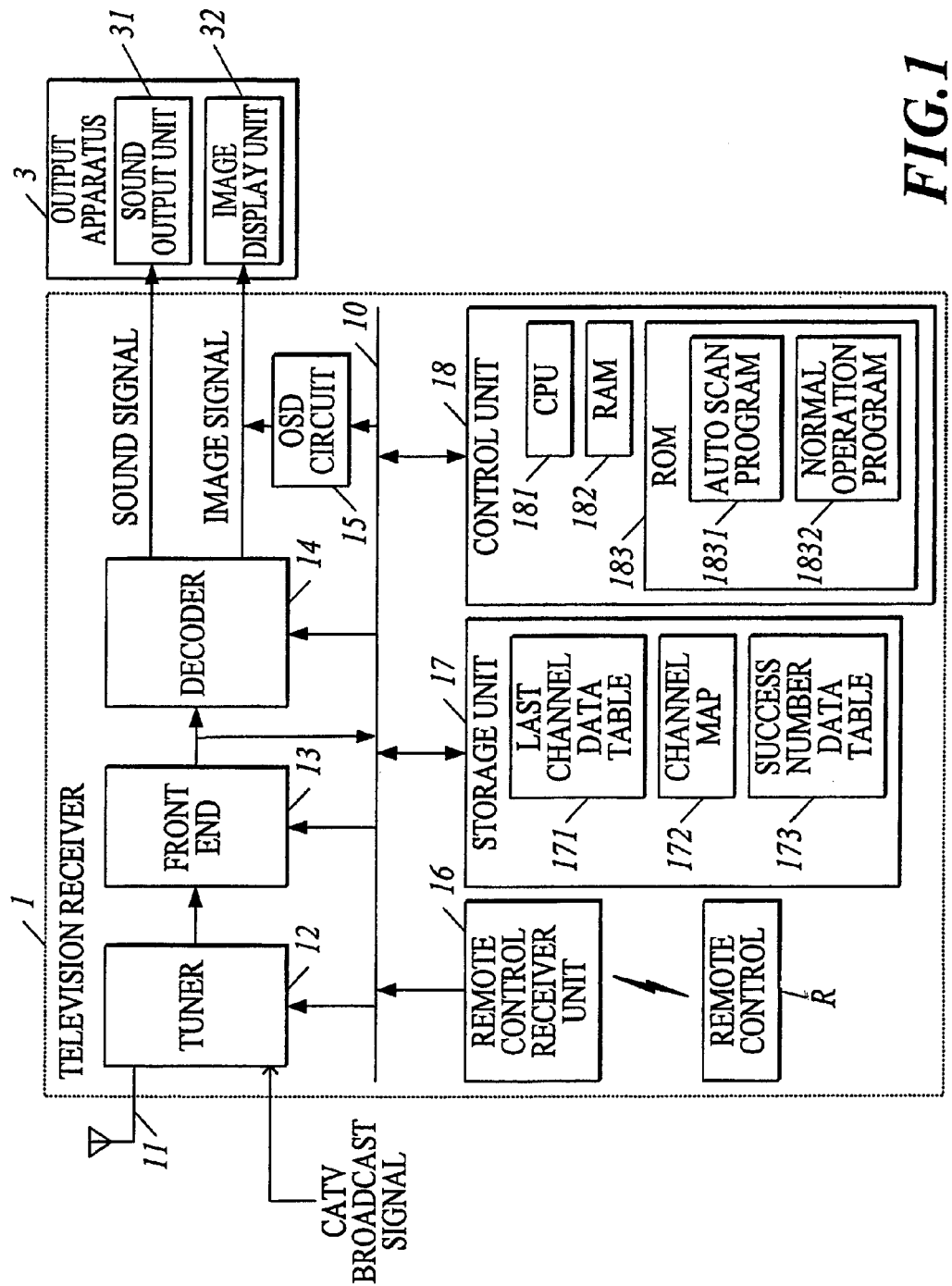
FIG. 1 is a block diagram showing the functional configuration of a television receiver according to the present invention.

In the following, the best mode of a television receiver according to the present invention will be described in detail with reference to the accompanying drawings. However, the scope of the invention is not limited to the illustrated examples.

<Configuration of Television Receiver>

First, the configuration of a television receiver 1 is described with reference to FIG. 1.

The television receiver 1 is, for example, a set top box (STB).

To put it concretely, the television receiver 1 is composed of, for example, a tuner 12 connected to an antenna 11 and an unshown CATV circuit, a front end 13, a decoder 14, an OSD circuit 15, a remote control receiver unit 16, a storage unit 17, a control unit 18 and the like. Each unit is connected to one another with a bus 10.

Moreover, the television receiver 1 is connected to an output apparatus 3 including a sound output unit 31 and an image display unit 32 with, for example, the decoder 14.

Moreover, the television receiver 1 is provided with a remote controller R (hereinafter referred to as a "remote control R") for the television receiver 1 and the output apparatus 3, which remote control R can communicate with, for example, the remote control receiver unit 16.

The tuner 12 receives a CATV broadcast signal existing in the frequency band corresponding to a channel among the CATV broadcast signals of the digital system transmitted from an unshown CATV circuit as a reception unit in accordance with, for example, a control signal input from the control unit 18, and outputs the received CATV broadcast signal to the front end 13.

To put it concretely, the tuner 12 tunes, for example, the CATV broadcast signal transmitted from the unshown CATV circuit to the center frequency (the center frequency corresponding to the channel) set by the control unit 18, and thereby receives the CATV broadcast signal corresponding to the channel. Then, the tuner 12 converts the received CATV broadcast signal into an intermediate frequency signal to output the converted CATV broadcast signal to the front end 13.

Moreover, the tuner 12 receives the terrestrial TV broadcast signal existing in the frequency band corresponding to the channel among the terrestrial TV broadcast signals of a digital system received by the antenna 11 in accordance with, for example, a control signal input from the control unit 18.

Here, the center frequency of a frequency band in which the CATV broadcast signal corresponding to each channel exists is described with reference to, for example, FIG. 2 showing the values of the center frequencies provide in the EIA/CEA-542-A standard.

It is supposed that a broadcasting station of CATV digital broadcasting transmits a CATV broadcast signal modulated by, for example, any one of the three kinds of the modulation methods (8 VSB, 64 QAM and 256 QAM) by means of any one of the three kinds of the frequency tables (STD, IRC and HRC). Then, it is also supposed that the channels (physical channels) that the television receiver 1 can receive are, for example, 1-135 channels, and that the width of the frequency band allotted to each channel is, for example, 6 MHz.

If the frequency table is the STD, for example, as shown in FIG. 2, the value of the center frequency of a CATV broadcast signal modulated by the modulation method of the VSB (8 VSB) is the value obtained by adding 0.31 MHz to the value of the lower side edge (LEC) of the frequency band of each channel, and the value of the center frequency of a CATV broadcast signal modulated by each of the modulation methods of the QAM's (64 QAM and 256 QAM) is a value obtained by adding 3 MHz to the value of the LEC.

Moreover, if the frequency table is the IRC, the value of the center frequency of the CATV broadcast signal modulated by the modulation method of the VSB (8 VSB) is the value obtained by adding 0.31 MHz to the value of the LEC of each channel, and the value of the center frequency of the CATV broadcast signal modulated by each of the modulation methods of the QAM's (64 QAM and 256 QAM) is a value obtained by adding 3 MHz to the value of the LEC.

Moreover, if the frequency table is the HRC, the value of the center frequency of the CATV broadcast signal modulated by the modulation method of the VSB (8 VSB) is the value obtained by subtracting 0.94 MHz from the value of the LEC of each channel, and the value of the center frequency of the CATV broadcast signal modulated by each of the modulation methods of the QAM's (64 QAM and 256 QAM) is a value obtained by adding 1.75 MHz to the value of the LEC of each channel.

That is, the value of the center frequency corresponding to a channel can be calculated based on the value of the LEC of the channel and a combination of the frequency table and the modulation method that are included in the channel data.

Hereupon, the values of the center frequencies are the same in both of the case where the frequency table is the STD and the case where the frequency table is the IRC. That is, although the kinds of the frequency tables are formally three, the kinds are substantially two (STD (or IRC) and HRC). Accordingly, the IRC is made to be included in the STD, and the IRC is made to be omitted in the following. Consequently, the channel data composed of the combinations of the frequency tables and the modulation methods of the CATV broadcast signals are composed of six kinds of combinations obtained by multiplying the two kinds of the frequency tables (STD and HRC) and the three kinds of the modulation methods (8 VSB, 64 QAM and 256 QAM) in the present embodiment.

The front end 13 demodulates a CATV broadcast signal (or a terrestrial TV broadcast signal) output from the tuner 12 by a demodulation method corresponding to a modulation method such as the 8 VSB, the 64 QAM or the 256 QAM in accordance with, for example, the control signal input from the control unit 18, and outputs the demodulated broadcast signal to the decoder 14.

The decoder 14 decodes a CATV broadcast signal (or a terrestrial TV broadcast signal) by performing the processing corresponding to a predetermined file format (for example, the Moving Picture Experts Group phase 2 (MPEG-2) format or the like) to the CATV broadcast signal (or the terrestrial TV broadcast signal) output from the front end 13 in accordance with, for example, a control signal input from the control unit 18. Then, the decoder 14 separates the decoded CATV broadcast signal (or the decoded terrestrial TV broadcast signal) into a sound signal and an image signal. The decoder 14 outputs the sound signal to the sound output unit 31 of the output apparatus 3, and outputs the image signal to the image display unit 32 of the output apparatus 3.

The sound output unit 31 included in the output apparatus 3 is, for example, speaker equipment or the like, and outputs the sound corresponding to the sound data based on the sound signal output from the decoder 14.

The image display unit 32 included in the output apparatus 3 is, for example, liquid crystal display equipment or the like. The image display unit 32 displays an image corresponding to image data based on the image signal output from the decoder 14 and an image corresponding to image data based on the image signal which has been output from the decoder 14 and with which an OSD display signal (which will be described later) is synthesized by the OSD circuit 15.

The OSD circuit 15 synthesizes an OSD display signal for making the image display unit 32 of the output apparatus 3 display predetermined on-screen display (OSD) with an image signal output from the decoder 14 to the image display unit 32 of the output apparatus 3 in accordance with, for example, a control signal input from the control unit 18.

The remote control receiver unit 16 receives various signals, for example, transmitted from the remote control R, and outputs various data based on the received various signals to the control unit 18.

The remote control R is operated by, for example, a user, and transmits the signal corresponding to the operation to the remote control receiver unit 16.

To put it concretely, the remote control R is used as, for example, a tuning unit when the user tunes in a channel.

The storage unit 17 is composed of, for example, a magnetic storage medium, an optical storage medium or a semiconductor memory.

To put it concretely, the storage unit 17, for example, stores a last channel data table 171, a channel map 172, a success number data table 173 and the like, as shown in FIG. 1.

The last channel data table 171, for example, stores the channel data composed of the combination of the frequency table and the modulation method of a CATV broadcast signal received by the tuner 12 in the channel that has been tuned in just before as a first storage unit and an auto scan storage unit at the time of an auto scan by a CPU 181 (which will be described later), which has executed an auto scan program 1831, or at the time of a normal operation by the CPU 181 (which will be described later), which has executed a normal operation program 1832.

To put it concretely, the last channel data table 171, for example, includes a "Last Channel Data" storage region 171a, a "Terrestrial/Cable Discrimination Flag" storage region 171b and the like, as shown in FIG. 3.

The "Last Channel Data" storage region 171a includes, for example, a "Last Frequency Table" storage region storing a frequency table and a "Last Modulation" storage region storing a modulation method.

The "Terrestrial/Cable Discrimination Flag" storage region 171b is set to store "Cable" at the time of being instructed to preset the channel data of a CATV broadcast signal by, for example, a user's operation of the remote control R or the like, and to store "Terrestrial" at the time of being instructed to preset the channel data of a terrestrial TV broadcast signal.

For example, it is supposed here that "256 QAM" is stored in the "Last Modulation" storage region of the "Last Channel Data" storage region 171a, and that "STD" is stored in the "Last Frequency Table" storage region of the "Last Channel Data" storage region 171a, and further that "Terrestrial" is stored in the "Terrestrial/Cable Discrimination Flag" storage region 171b at the time of factory shipment of the television receiver 1, as shown in FIG. 3.

The channel map 172 stores the channel data composed of the combination of the frequency table and the modulation method of a CATV broadcast signal received by the tuner 12 in each channel, which have been obtained by, for example, an auto scan by the CPU 181 (which will be described later), which has executed the auto scan program 1831, as a second storage unit.

Figure 4:
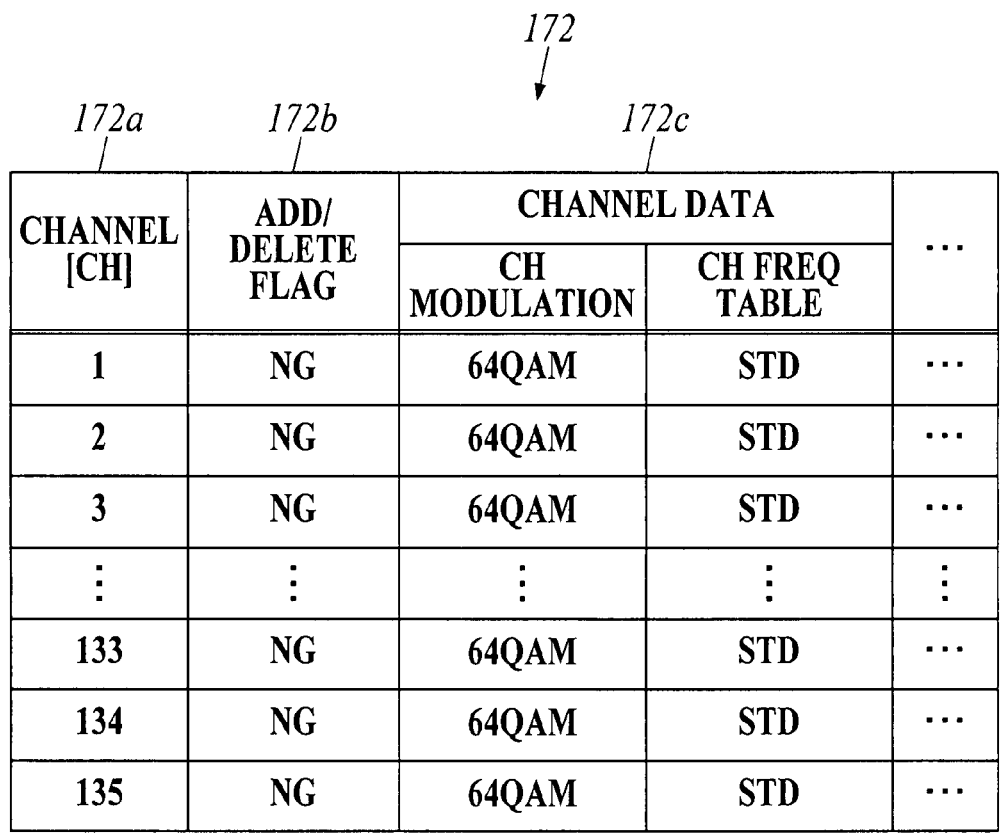
FIG. 4 is a diagram showing the data structure of a channel map shown in FIG. 1.

To put it concretely, the channel map 172 includes, for example, a "Channel" storage region 172a, an "Add/Delete Flag" storage region 172b, a "Channel Data" storage region 172c and the like, as shown in FIG. 4.

The "Channel" storage region 172a stores, for example, channels (physical channels) that can be received by the television receiver 1.

The "Add/Delete Flag" storage region 172b is set to store, for example, a "GOOD" if the reception of a CATV broadcast signal has succeeded, and to store a "NG" if the reception of a CATV broadcast signal has failed at the time of an auto scan by the CPU 181 (which will be described later), which has executed the auto scan program 1831.

The "Channel Data" storage region 172c includes, for example, a "Channel Frequency Table" storage region storing frequency tables, and a "Channel Modulation" storage region storing modulation methods.

Here, it is supposed for example that the "NG" is stored in each column of the "Add/Delete Flag" storage region 172b, and that the "64 QAM" is stored in each column of the "Channel Modulation" storage region of the "Channel Data" storage region 172c, and further that the "STD" is stored in each column of the "Channel Frequency Table" storage region of the "Channel Data" storage region 172c at the time of factory shipment of the television receiver 1, as shown in FIG. 4.

The success number data table 173 stores, for example, the success number of the reception of CATV broadcast signals to each channel data as a success number storage unit.

Figure 5:
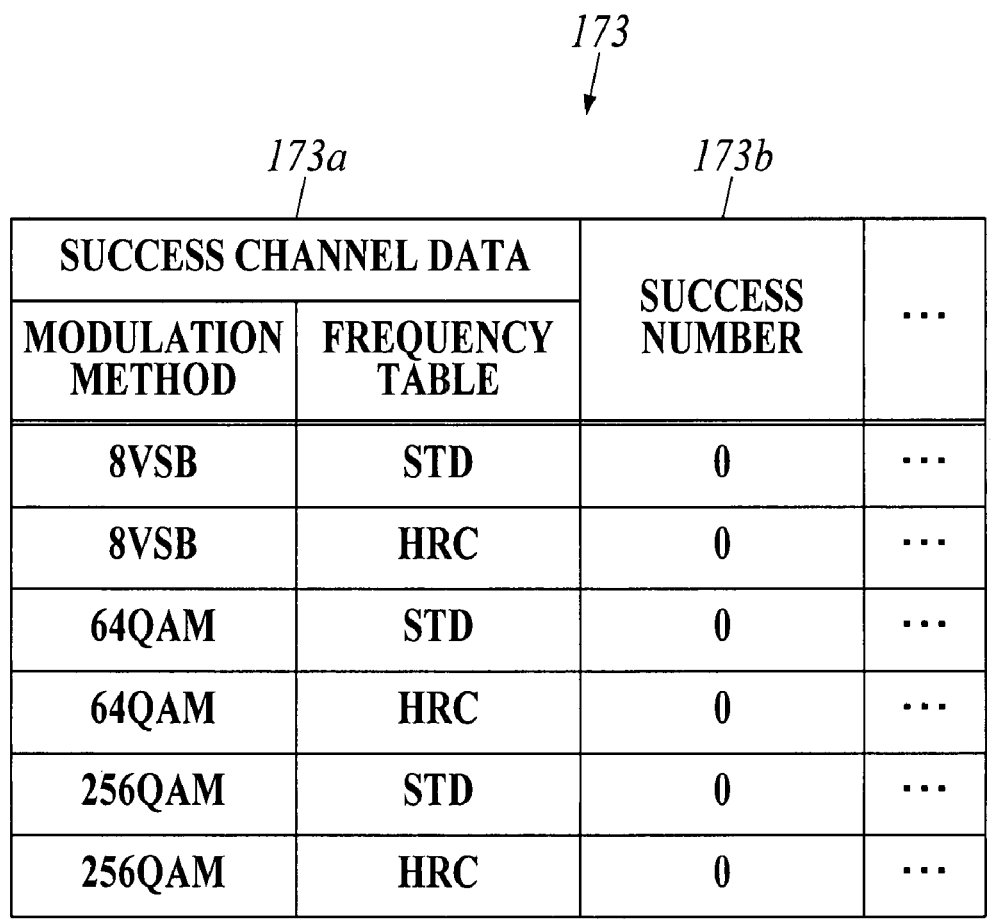
FIG. 5 is a diagram showing the data structure of a success number data table shown in FIG. 1.

To put it concretely, the success number data table 173 includes, for example, a "success channel data" storage region 173a including a "modulation method" storage region storing modulation methods and a "frequency table" storage region storing frequency tables, and a "Success Number" storage region 173b storing success numbers of the reception of CATV broadcast signals, as shown in FIG. 5.

Here, it is supposed, for example, that "0 (zero)" is stored in each of the columns of the "Success Number" storage region 173b at the time of factory shipment of the television receiver 1, as shown in FIG. 5.

The control unit 18 is provided with, for example, a central processing unit (CPU) 181, a random access memory (RAM) 182, a read only memory (ROM) 183 and the like, as shown in FIG. 1.

The CPU 181 performs various control operations in accordance with various processing programs for the television receiver 1, which are stored in the ROM 183.

The RAM 182 is provided with a program storage region for expanding processing programs executed by the CPU 181 and the like, a data storage region storing input data, processing results produced at the time of the execution of the processing programs and the like, and the like.

The ROM 183 stores a system program, which can be executed by the television receiver 1, various processing programs that can be executed by the system program, data that is used at the time of executing those various processing programs, various result data of operation processing of the CPU 181 and the like. In addition, the programs are stored in the ROM 183 in the form of the program codes that a computer can read.

To put it concretely, the ROM 183 stores, for example, the auto scan program 1831, the normal operation program 1832 and the like.

The auto scan program 1831 enables the CPU 181 to realize the function of performing the setting (presetting) of the channel data of a CATV broadcast signal received by the tuner 12 to each channel at a predetermined timing.

Here, the predetermined timing is, for example, the timing of being instructed to perform the presetting of the channel data of a CATV broadcast signal by performing an auto scan of channels by a user's operation of the remote control R or the like.

To put it concretely, for example, when a channel is tuned in by the CPU 181 during a channel scan, the CPU 181 sets the channel data stored in the "Last Channel Data" storage region 171a of the last channel data table 171 as the channel data of the CATV broadcast signal corresponding to the tuned channel, and makes the tuner 12 receive the CATV broadcast signal corresponding to the tuned channel. Then, the CPU 181 judges whether the tuner 12 has succeeded in the reception of the CATV broadcast signal or not by setting the channel data stored in the "Last Channel Data" storage region 171a of the last channel data table 171. When the CPU 181 judges that the tuner 12 has not succeeded in the reception of the CATV broadcast signal, the CPU 181 sequentially changes the channel data to be set in a previously determined order, and makes the tuner 12 receive the CATV broadcast signal corresponding to the tuned channel. Subsequently, when the CPU 181 judges that the tuner 12 has succeeded in the reception of the CATV broadcast signal, the CPU 181 updates the channel data stored in the last channel data table 171 to the channel data set at the success.

Here, the setting of channel data means to set the center frequency corresponding to a tuned channel, which center frequency has been obtained by the calculation based on, for example, the LEC of the tuned channel and the combination of the frequency table and the modulation method that are included in the channel data, into the tuner 12, and to set the demodulation method corresponding to the modulation method included in the channel data into the front end 13.

Moreover, the previously determined order means, for example, the order of the frequency tables and the order of the modulation methods that are most frequently adopted in the CATV broadcasting. To put it concretely, for example, the order of STD→HRC when the "last frequency table" in the "Last Channel Data" storage region 171a of the last channel data table 171 is the STD, and the order of HRC→STD when the "last frequency table" is the HRC. When the "last modulation" in the "Last Channel Data" storage region 171a of the last channel data table 171 is the 64 QAM, the order is that of 64 QAM→256 QAM→8 VSB, and when the "last modulation" is the 256 QAM, the order is that of 256 QAM→64 QAM→8 VSB, and further when the "last modulation" is the 8 VSB, the order is that of 8 VSB→256 QAM→64 QAM.

Moreover, whether the tuner 12 has succeeded in the reception of a CATV broadcast signal or not is judged by, for example, whether the CATV broadcast signal has been output from the front end 13 or not. To put it concretely, when a CATV broadcast signal has been output from the front end 13, the CPU 181 judged that the tuner 12 has succeeded in the reception of the CATV broadcast signal. When no CATV broadcast signals have been output from the front end 13, the CPU 181 judges that the tuner 12 has failed in the reception of any CATV broadcast signals.

The CPU 181 functions as an auto scan unit and an auto scan reception control unit by executing such an auto scan program 1831.

The normal operation program 1832 enables the CPU 181 to realize the function of making the tuner 12 receive the CATV broadcast signal corresponding to a tuned channel by setting the channel data of the combination of the frequency table stored in the "Last Frequency Table" storage region of the "Last Channel Data" storage region 171a of the last channel data table 171 and the modulation method that corresponds to the tuned channel and is stored in the "Channel Modulation" storage region of the "Channel Data" storage region 172c of the channel map 172 as the channel data of the CATV broadcast signal corresponding to the tuned channel when the channel is tuned in by, for example, a user's operation of the remote control R or the like.

To put it concretely, the CPU 181 judges whether the tuner 12 has succeeded in the reception of the CATV broadcast signal or not by setting the channel data composed of the frequency table stored in the "Last Frequency Table" storage region of the "Last Channel Data" storage region 171a of the last channel data table 171 and the modulation method that corresponds to the tuned channel and is stored in the "Channel Modulation" storage region of the "Channel Data" storage region 172c of the channel map 172. When the CPU 181 judges that the tuner 12 has not succeeded in the reception of the CATV broadcast signal, the CPU 181 sequentially changes channel data to be set in the previously determined order, and makes the tuner 12 receive the CATV broadcast signal corresponding to the tuned channel. Subsequently, when the CPU 181 judges that the tuner 12 has succeeded in the reception of the CATV broadcast signal, the CPU 181 updates the channel data stored in the "Last Channel Data" storage region 171a of the last channel data table 171 and the channel data that corresponds to the tuned channel and is stored in the "Channel Data" storage region 172c of the channel map 172 to the channel data set at the time of the success, respectively.

Here, the previously determined order may be, for example, the order of the frequency tables and the order of the modulation methods that are most frequently adopted in the CATV broadcasting, or may be the descending order of the channel data from the one having the largest success number stored in the "Success Number" storage region 173b of the success number data table 173.

The CPU 181 functions as a reception control unit by executing such a normal operation program 1832.

<Processing by Television Receiver>

Next, the processing by the television receiver 1 is described with reference to the flow charts of FIGS. 6-15.

[Channel Scan Processing]

Figure 6A:
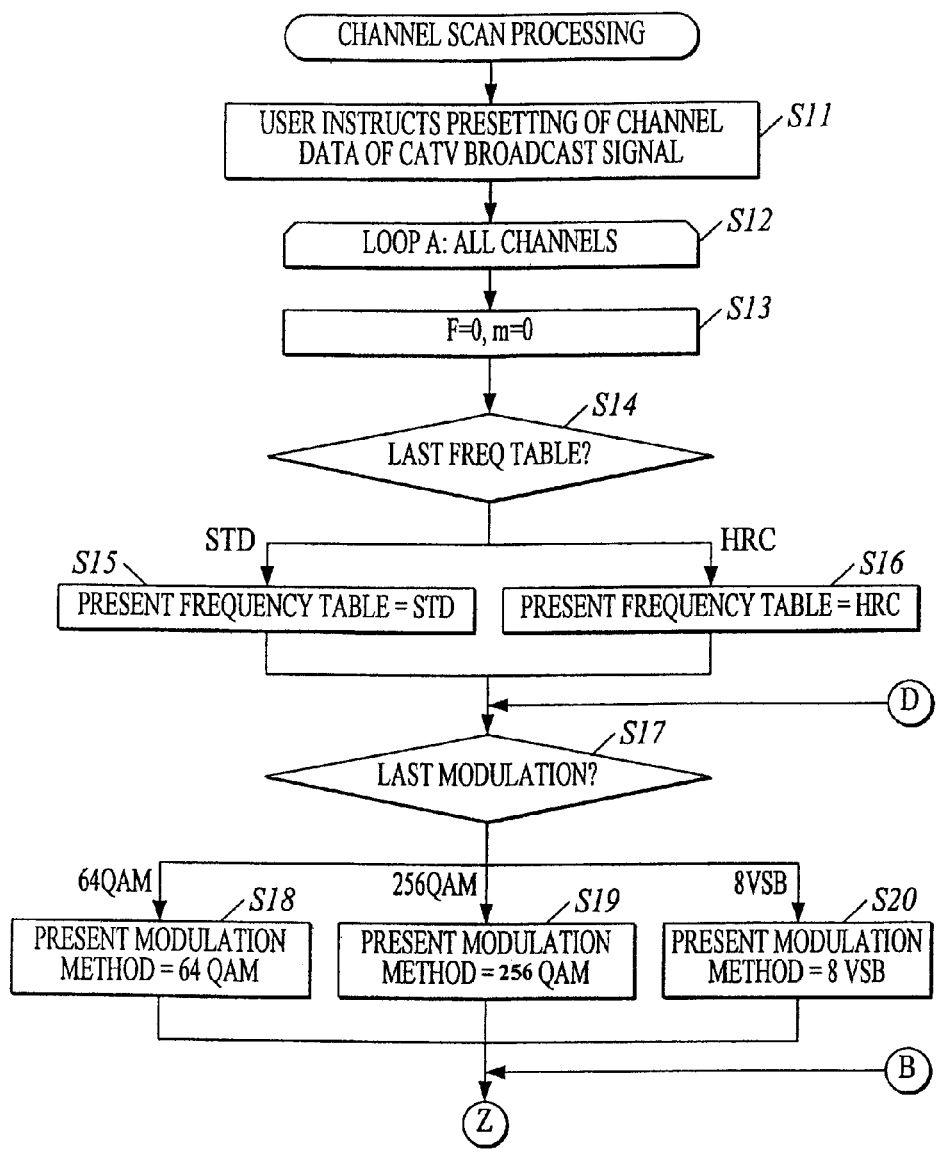
FIG. 6 is a flow chart for illustrating first processing pertaining to a channel scan by a television receiver according to the present invention.
Figure 6B:
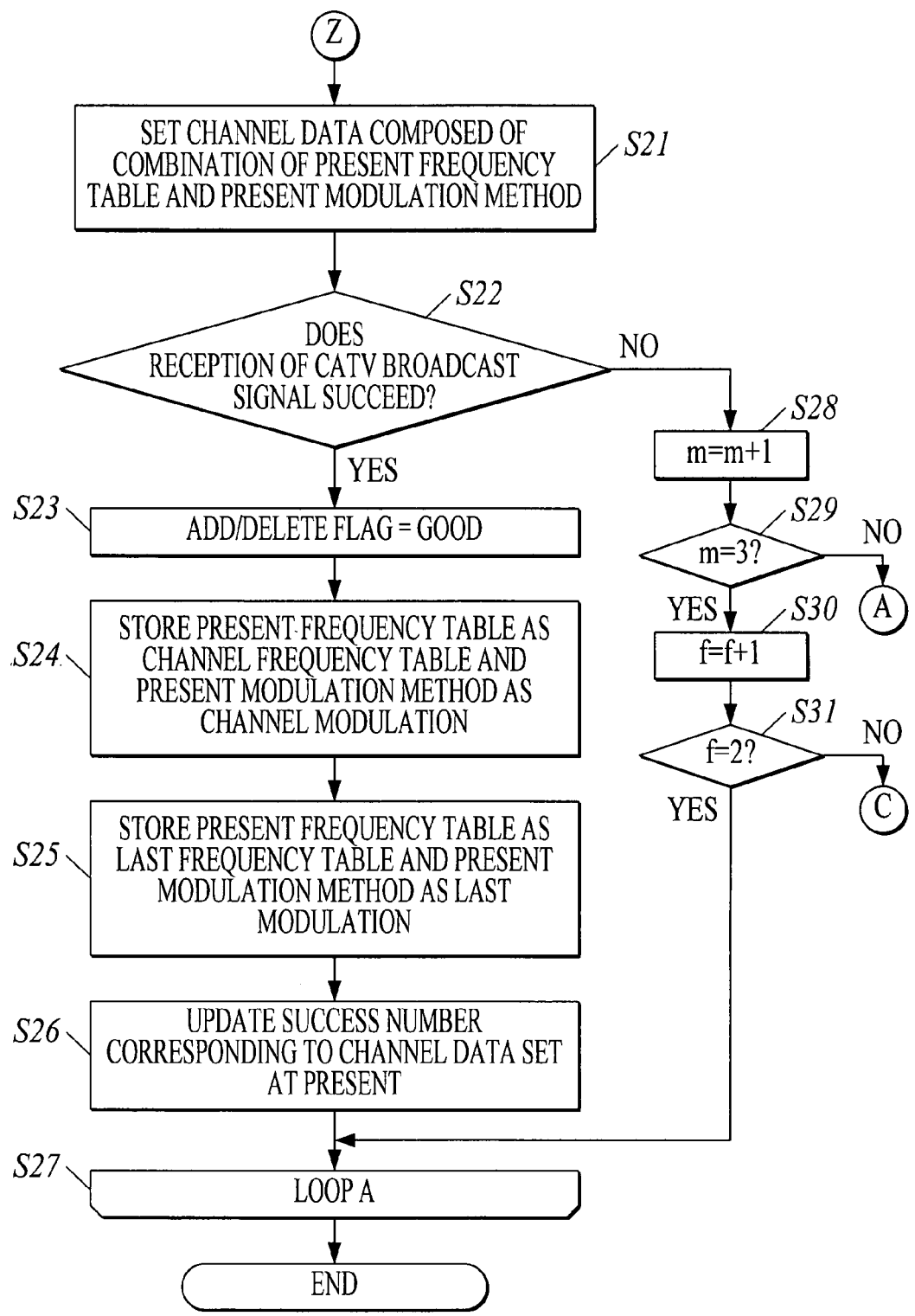
Figure 7:
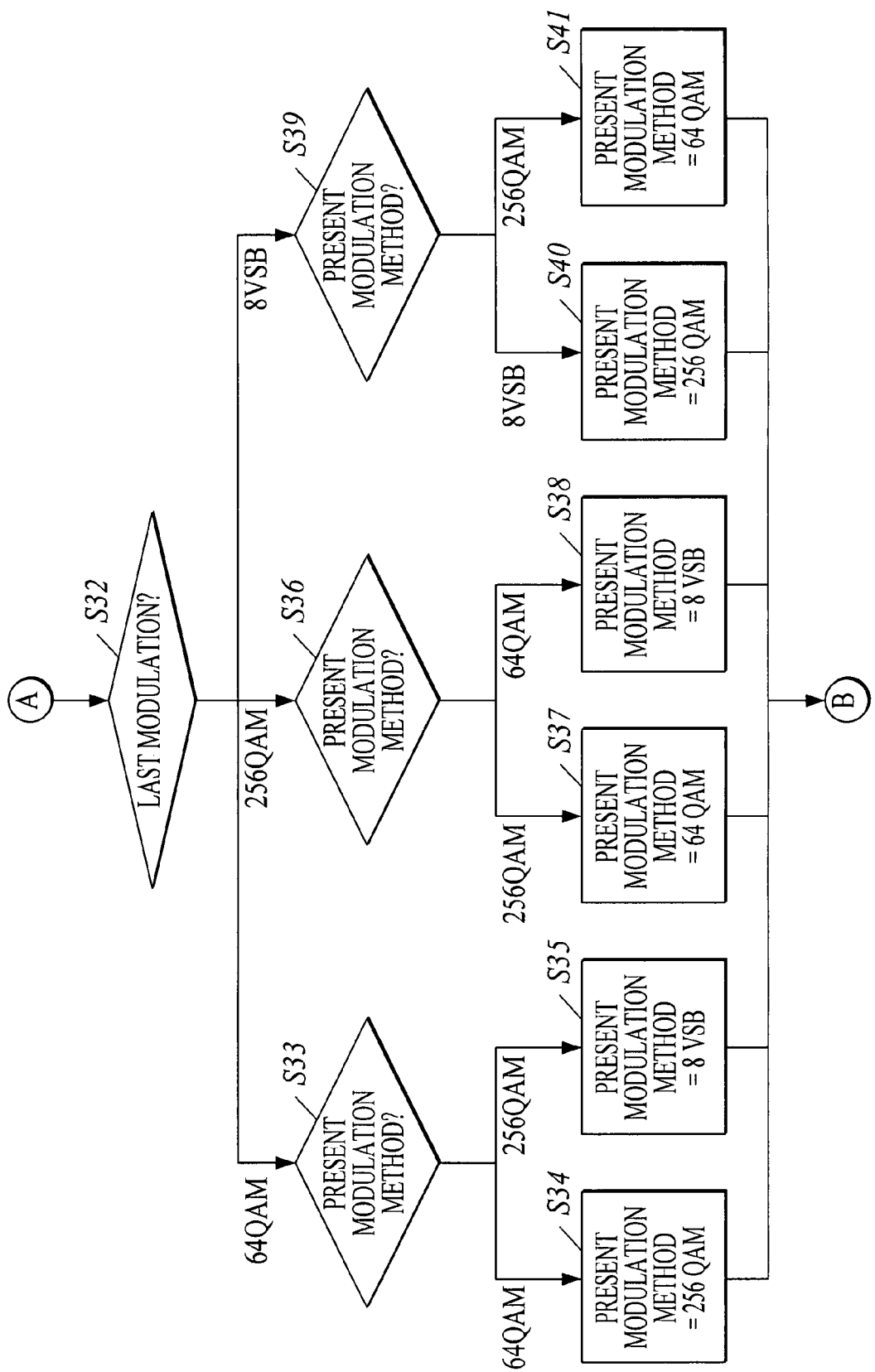
FIG. 7 is a flow chart for illustrating second processing pertaining to the channel scan by the television receiver according to the present invention.
Figure 8:
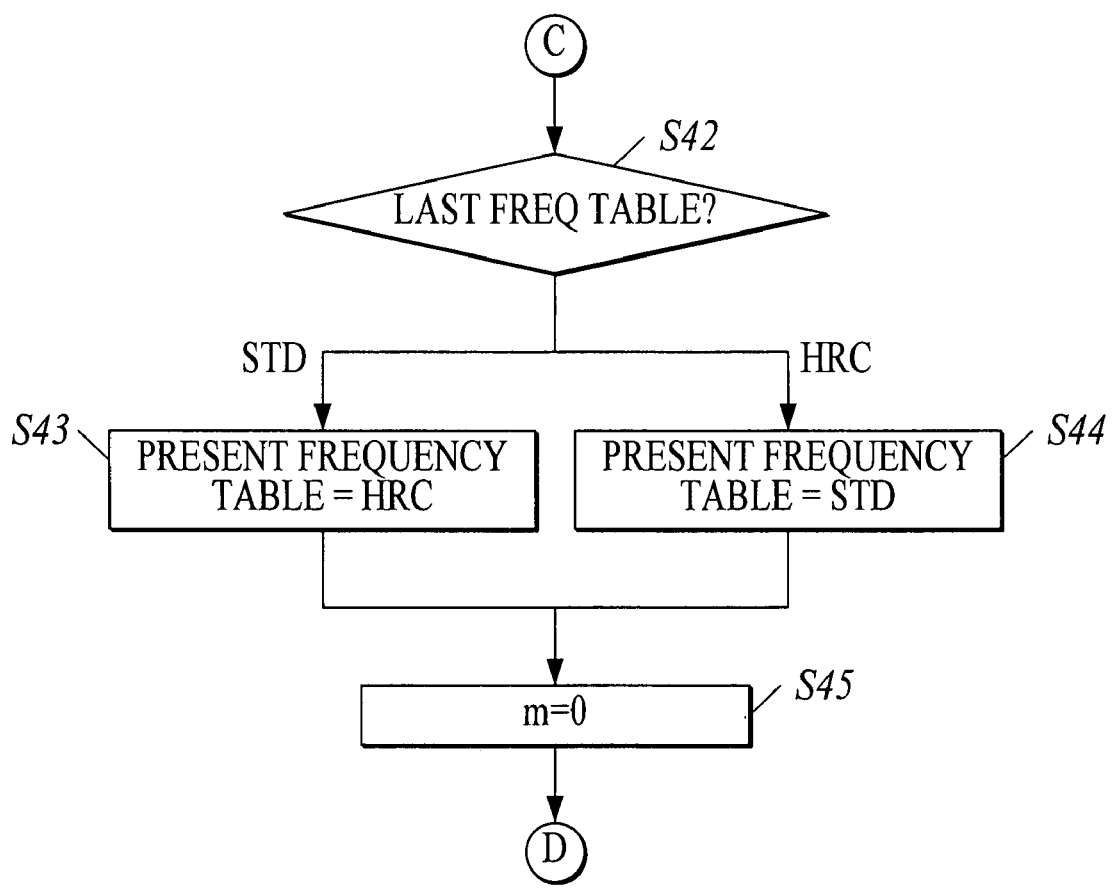
FIG. 8 is a flow chart for illustrating third processing pertaining to the channel scan by the television receiver according to the present invention.

First, the processing pertaining to a channel scan by the television receiver 1 is described with reference to FIGS. 6-8.

First, when the television receiver 1 is instructed to perform the presetting of the channel data of a CATV broadcast signal by, for example, performing the auto scan of the channels by a user's operation of the remote control R or the like (Step S11), the CPU 181 executes the auto scan program 1831 to store the "Cable" into the "Terrestrial/Cable Discrimination Flag" storage region 171b of the last channel data table 171, and performs the processing of loop A to all the channels that can be received by the television receiver 1 (Steps S12-S27).

To put it concretely, in the processing of the loop A in a channel, the CPU 181 first sets "0" in an "f" storage region in the RAM 182, and sets "0" in an "m" storage region in the RAM 182 (Step S13).

Subsequently, the CPU 181 judges whether the frequency table stored in the "Last Frequency Table" storage region in the "Last Channel Data" storage region 171a of the last channel data table 171 is the STD or the HRC (Step S14).

When the CPU 181 judges that the frequency table is the STD at the Step S14 (Step S14; STD), the CPU 181 sets the "STD" into the "present frequency table" storage region of the RAM 182 (Step S15).

Moreover, when the CPU 181 judges that the frequency table is the HRC at the Step S14 (Step S14; HRC), the CPU 181 sets the "HRC" into the "present frequency table" storage region in the RAM 182 (Step S16).

Subsequently, the CPU 181 judges which of the 64 QAM, the 256 QAM and the 8 VSB the modulation method stored in the "Last Modulation" storage region of the "Last Channel Data" storage region 171a of the last channel data table 171 is (Step S17).

When the CPU 181 judges that the modulation method is the 64 QAM at the Step S17 (Step S17; 64 QAM), the CPU 181 sets the "64 QAM" into the "present modulation method" storage region in the RAM 182 (Step S18).

Moreover, when the CPU 181 judges that the modulation method is the 256 QAM at the Step S17 (Step S17; 256 QAM), the CPU 181 sets the "256 QAM" in the "present modulation method" storage region in the RAM 182 (Step S19).

Moreover, when the CPU 181 judges that the modulation method is the 8 VSB at the Step S17 (Step S17; 8 VSB), the CPU 181 sets the "8 VSB" into the "present modulation method" storage region in the RAM 182 (Step S20).

Subsequently, the CPU 181 sets the channel data composed of the combination of the frequency table set in the "present frequency table" storage region and the modulation method set in the "present modulation method" storage region into the tuner 12 and the front end 13 (Step S21), and judges whether the tuner 12 has succeeded in the reception of the CATV broadcast signal or not (Step S22).

When the CPU 181 judges that the tuner 12 has succeeded in the reception at Step S22 (Step S22; Yes), the CPU 181 stores "GOOD" in the region corresponding to the channel in the "Add/Delete Flag" storage region 172b of the channel map 172 (Step S23).

Subsequently, the CPU 181 stores the frequency table set in the "present frequency table" storage region as the channel frequency table, and the modulation method set in the "present modulation method" storage region as the channel modulation (Step S24).

To put it concretely, the CPU 181 stores the frequency table set in the "present frequency table" storage region into the region corresponding to the channel in the "Channel Frequency Table" storage region of the "Channel Data" storage region 172c of the channel map 172, and stores the modulation method set in the "present modulation method" storage region into the region corresponding to the channel in the "Channel Modulation" storage region of the "Channel Data" storage region 172c of the channel map 172.

Subsequently, the CPU 181 stores the frequency table set in the "present frequency table" storage region as the last frequency table, and stores the modulation method set in the "present modulation method" storage region as the last modulation (Step S25).

To put it concretely, the CPU 181 stores the frequency table set in the "present frequency table" storage region into the region corresponding to the channel in the "Last Frequency Table" storage region of the "Last Channel Data" storage region 171*a* of the last channel data table 171, and stores the modulation method set in the "present modulation method" storage region into the region corresponding to the channel in the "Last Modulation" storage region of the "Last Channel Data" storage region 171*a* of the last channel data table 171.

Subsequently, the CPU 181 updates the success number corresponding to the presently set channel data (namely, the channel data composed of the combination of the frequency table set in the "present frequency table" storage region and the modulation method set in the "present modulation method" storage region) (Step S26).

To put it concretely, the CPU 181 updates the success number by adding one to the success number stored in the region corresponding to the presently set channel data in the "Success Number" storage region 173*b* of the success number data table 173.

Then, when the processing of the loop A to all the channels that can be received by the television receiver 1 ends (Step S27), the CPU 181 ends the present processing.

Moreover, when the CPU 181 judges that the tuner 12 has failed in the reception of the CATV broadcast signal at Step S22 (Step S22; No), the CPU 181 sets "m+1" in the "m" storage region in the RAM 182 (Step S28), and judges whether the numerical value set in the "m" storage region is three or not (Step S29).

When the CPU 181 judges that the numerical value set in the "m" storage region is thee at Step S29 (Step S29; Yes), the CPU 181 sets "f+1" in the "f" storage region in the RAM 182 (Step S30), and judges whether the numerical value set in the "f" storage region is two or not (Step S31).

When the CPU 181 judges that the numerical value set in the "f" storage region is two at the Step S31 (Step S31; Yes), the processing of the CPU 181 moves to that at the Step S27.

Moreover, when the CPU 181 judges that the numerical value set in the "m" storage region is not three at the Step S29 (Step S29; No), the CPU 181 judges which of the 64 QAM, the 256 QAM and the 8 VSB the modulation method stored in the "Last Modulation" storage region of the "Last Channel Data" storage region 171*a* of the last channel data table 171 is (Step S32).

When the CPU 181 judges that the modulation method is the 64 QAM at the Step S32 (Step S32; 64 QAM), the CPU 181 judges whether the modulation method set in the "present modulation method" storage region in the RAM 182 is the 64 QAM or the 256 QAM (Step S33). When the CPU 181 judges that the modulation method is the 64 QAM at the Step S33 (Step S33; 64 QAM), the CPU 181 sets the "256 QAM" in the "present modulation method" storage region in the RAM 182 (Step S34), and the processing of the CPU 181 moves to that at the Step S21.

Moreover, when the CPU 181 judges that the modulation method is the 256 QAM at the Step S33 (Step S33; 256 QAM), the CPU 181 sets the "8 VSB" in the "present modulation method" storage region in the RAM 182 (Step S35), and the processing of the CPU 181 moves to that at the Step S21.

Moreover, when the CPU 181 judges that the modulation method is the 256 QAM at the Step S32 (Step S32; 256 QAM), the CPU 181 judges whether the modulation method set in the "present modulation method" storage region in the RAM 182 is the 256 QAM or the 64 QAM (Step S36).

When the CPU 181 judges that the modulation method is the 256 QAM at the Step S36 (Step S36; 256 QAM), the CPU 181 sets the "64 QAM" in the "present modulation method" storage region in the RAM 182 (Step S37), and the processing of the CPU 181 moves to that at the Step S21.

Moreover, when the CPU 181 judges that the modulation method is the 64 QAM at Step S36 (Step S36; 64 QAM), the CPU 181 sets the "8 VSB" in the "present modulation method" storage region in the RAM 182 (Step S38), and the processing of the CPU 181 moves to that at the Step S21.

Moreover, when the CPU 181 judges that the modulation method is the 8 VSB at the Step S32 (Step S32; 8 VSB), the CPU 181 judges whether the modulation method set in the "present modulation method" storage region in the RAM 182 is the 8 VSB or the 256 QAM (Step S39).

When the CPU 181 judges that the modulation method is the 8 VSB at the Step S39 (Step S39; 8 VSB), the CPU 181 sets the "256 QAM" in the "present modulation method" storage region in the RAM 182 (Step S40), and the processing of the CPU 181 moves to that at the Step S21.

Moreover, when the CPU 181 judges that the modulation method is the 256 QAM at the Step S39 (Step S39; 256 QAM), the CPU 181 sets the "64 QAM" in the "present modulation method" storage region in the RAM 182 (Step S41), and the processing of the CPU 181 moves to that at the Step S21.

Moreover, when the CPU 181 judges that the numerical value set in the "f" storage region is not "2" at the Step S31 (Step S31; No), the CPU 181 judges whether the frequency table stored in the "Last Frequency Table" storage region of the "Last Channel Data" storage region 171*a* of the last channel data table 171 is the STD or the HRC (Step S42).

When the CPU 181 judges that the frequency table is the STD at the Step S42 (Step S42; STD), the CPU 181 sets the "HRC" in the "present frequency table" storage region in the RAM 182 (Step S43).

Moreover, when the CPU 181 judges that the frequency table is the HRC at the Step S42 (Step S42; HRC), the CPU 181 sets the "STD" in the "present frequency table" storage region in the RAM 182 (Step S44).

Subsequently, the CPU 181 sets "0" as the numerical value set in the "m" storage region in the RAM 182 (Step S45), and the processing of the CPU 181 moves to that at the Step S17.

[Channel Tuning Processing]

Figure 9A:
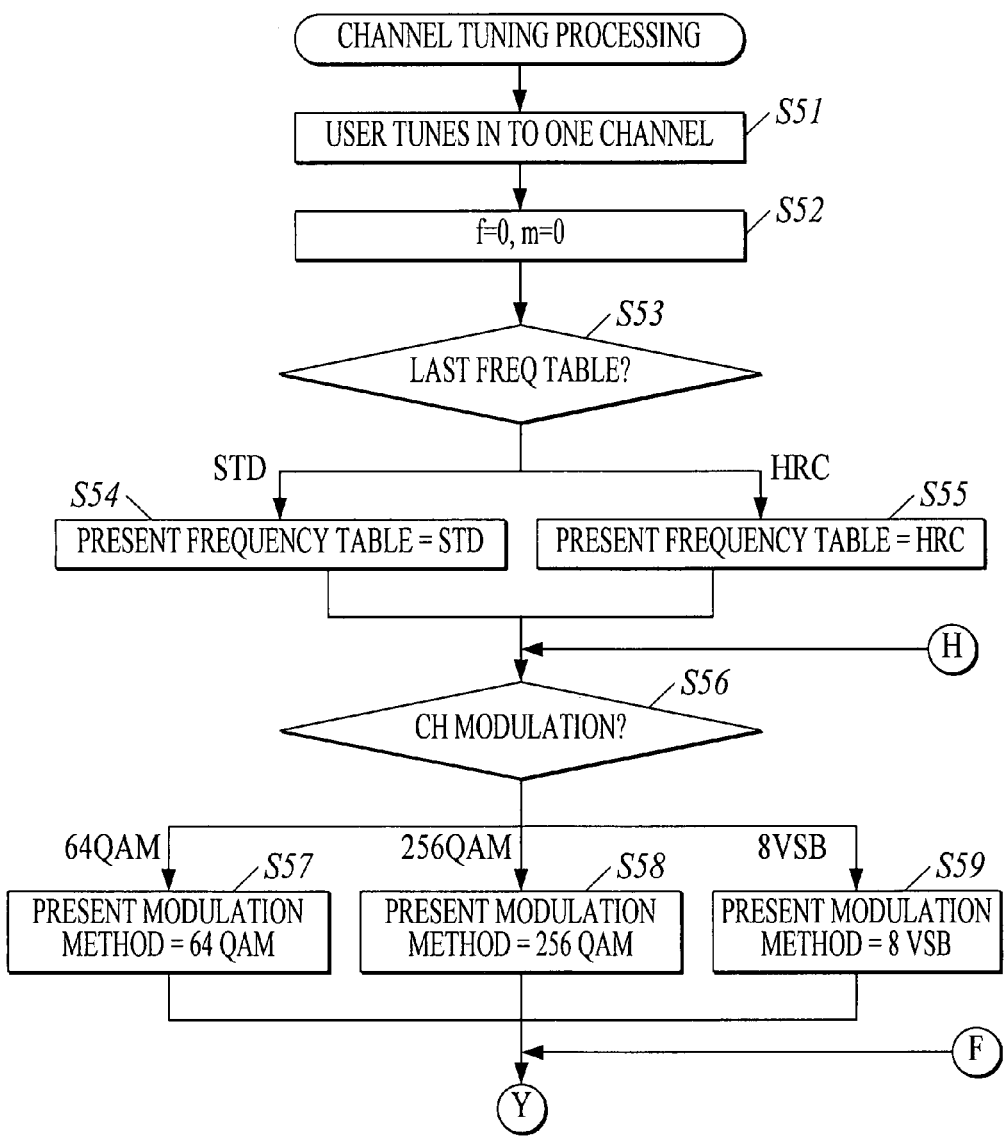
FIG. 9 is a flow chart for illustrating first processing pertaining to channel tuning by the television receiver according to the present invention.
Figure 11:
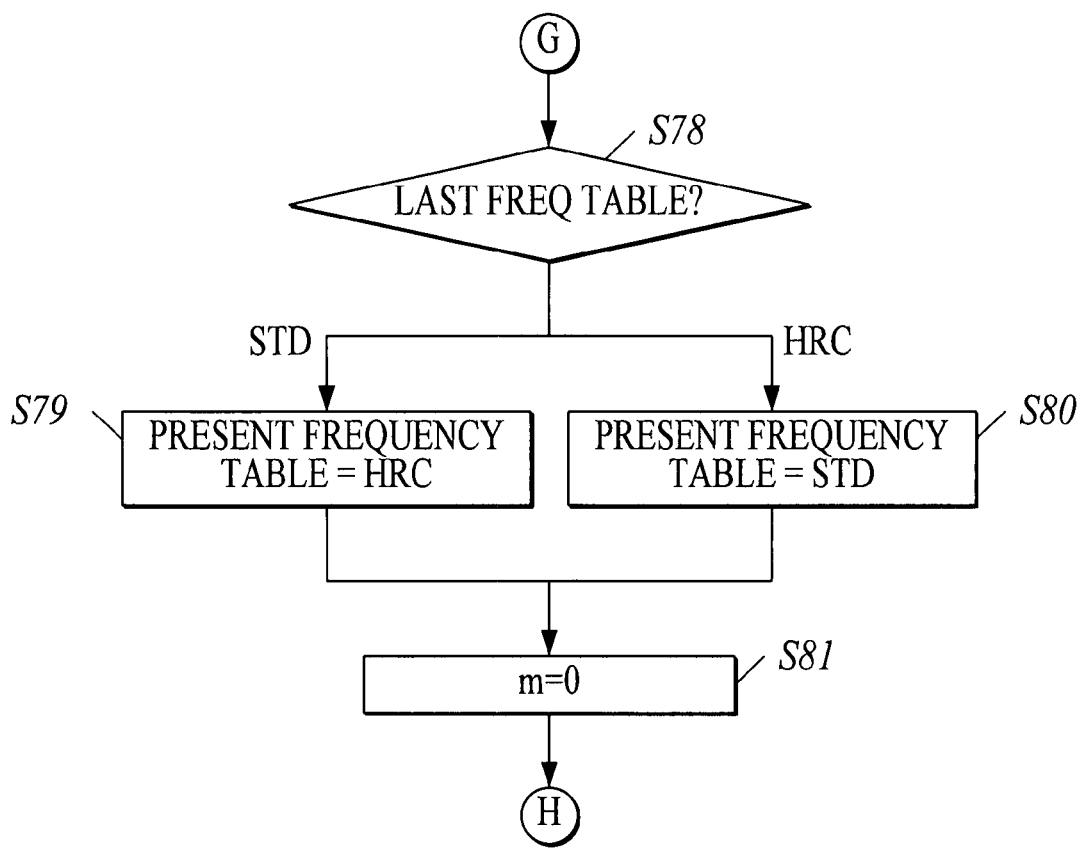
FIG. 11 is a flow chart for illustrating third processing pertaining to the channel tuning by the television receiver according to the present invention.

Next, the processing pertaining to the channel tuning by the television receiver 1 is described with reference to FIGS. 9-11.

First, when a channel is tuned in, for example, by a user's operation of the remote control R or the like at the time of the normal operation of the television receiver 1 (Step S51), the CPU 181 executes the normal operation program 1832 to set "0" in the "f" storage region in the RAM 182 and to set "0" in the "m" storage region in the RAM 182 (Step S52).

Subsequently, the CPU 181 judges whether the frequency table stored in the "Last Frequency Table" storage region in the "Last Channel Data" storage region 171*a* of the last channel data table 171 is the STD or the HRC (Step S53).

When the CPU 181 judges that the frequency table is the STD at the Step S53 (Step S53; STD), the CPU 181 sets the "STD" in the "present frequency table" storage region in the RAM 182 (Step S54).

Moreover, when the CPU 181 judges that the frequency table is the HRC at the Step S53 (Step S53; HRC), the CPU 181 sets the "HRC" in the "present frequency table" storage region in the RAM 182 (Step S55).

Subsequently, the CPU 181 judges which of the 64 QAM, the 256 QAM and the 8 VSB the modulation method stored in the "Channel Modulation" storage region of the "Channel Data" storage region 172c of the channel map 172 is (Step S56).

When the CPU 181 judges that the modulation method is the 64 QAM at the Step S56 (Step S56; 64 QAM), the CPU 181 sets the "64 QAM" in the "present modulation method" storage region in the RAM 182 (Step S57).

Moreover, when the CPU 181 judges that the modulation method is the 256 QAM at the Step S56 (Step S56; 256 QAM), the CPU 181 sets the "256 QAM" in the "present modulation method" storage region in the RAM 182 (Step S58).

Moreover, when the CPU 181 judges that the modulation method is the 8 VSB at the Step S56 (Step S56; 8 VSB), the CPU 181 sets the "8 VSB" in the "present modulation method" storage region in the RAM 182 (Step S59).

Subsequently, the CPU 181 sets the channel data composed of the combination of the frequency table set in the "present frequency table" storage region and the modulation method set in the "present modulation method" storage region into the tuner 12 and the front end 13 (Step S60), and judges whether the tuner 12 has succeeded in the reception of a CATV broadcast signal or not (Step S61).

When the CPU 181 judges that the tuner 12 has succeeded in the reception at the Step S61 (Step S61; Yes), the CPU 181 stores the frequency table set in the "present frequency table" storage region as the channel frequency table, and the modulation method set in the "present modulation method" storage region as the channel modulation (Step S62).

Subsequently, the CPU 181 stores the frequency table stored in the "present frequency table" storage region as the last frequency table, and the modulation method stored in the "present modulation method" storage region as the last modulation (Step S63), and the CPU 181 ends the present processing.

Moreover, when the CPU 181 judges that the tuner 12 has failed in the reception at the Step S61 (Step S61; No), the CPU 181 sets "m+1" in the "m" storage region in the RAM 182 (Step S64), and judges whether the numerical value set in the "m" storage region is three or not (Step S65).

When the CPU 181 judges that the numerical value set in the "m" storage region is three at the Step S65 (Step S65; Yes), the CPU 181 sets "f+1" in the "f" storage region in the RAM 182 (Step S66), and judges whether the numerical value set in the "f" storage region is two or not (Step S67).

When the CPU 181 judges that the numerical value set in the "f" storage region is two at the Step S67 (Step S67; Yes), the CPU 181 ends the present processing.

Moreover, when the CPU 181 judges that the numerical value set in the "m" storage region is not three at the Step S65 (Step S65; No), the CPU 181 performs the processing at Steps S68-S77. In addition, because the processing at the Steps S68-S77 is almost the same as that at the Steps S32-S41 (FIG. 7), the minute descriptions thereof are omitted.

Moreover, when the CPU 181 judges that the numerical value set in the "f" storage region is not two at the Step S67 (Step S67; No), the CPU 181 performs the processing at Steps S78-S81. In addition, because the processing at the Steps S78-S81 is almost the same as that at the Steps S42-S45 (FIG. 8), the minute descriptions thereof are omitted.

[Modified Example of Channel Tuning Processing]

Figure 12:
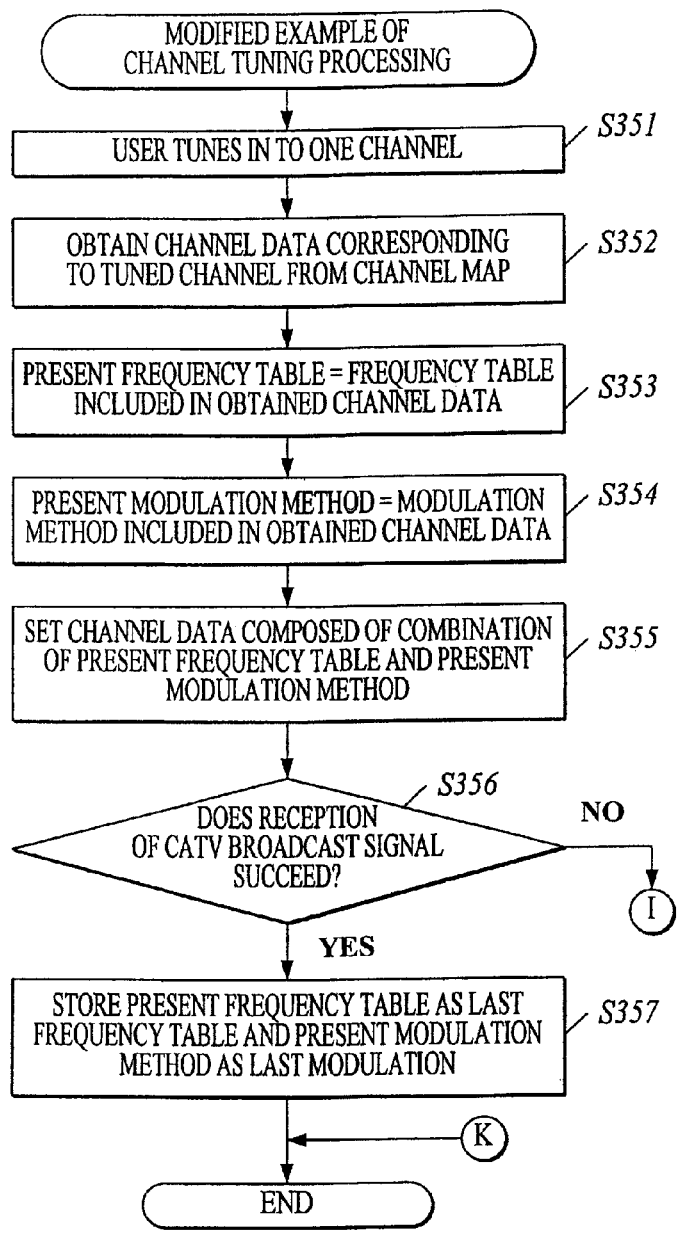
FIG. 12 is a flow chart for illustrating first processing pertaining to a modified example of the channel tuning by the television receiver according to the present invention.
Figure 13:
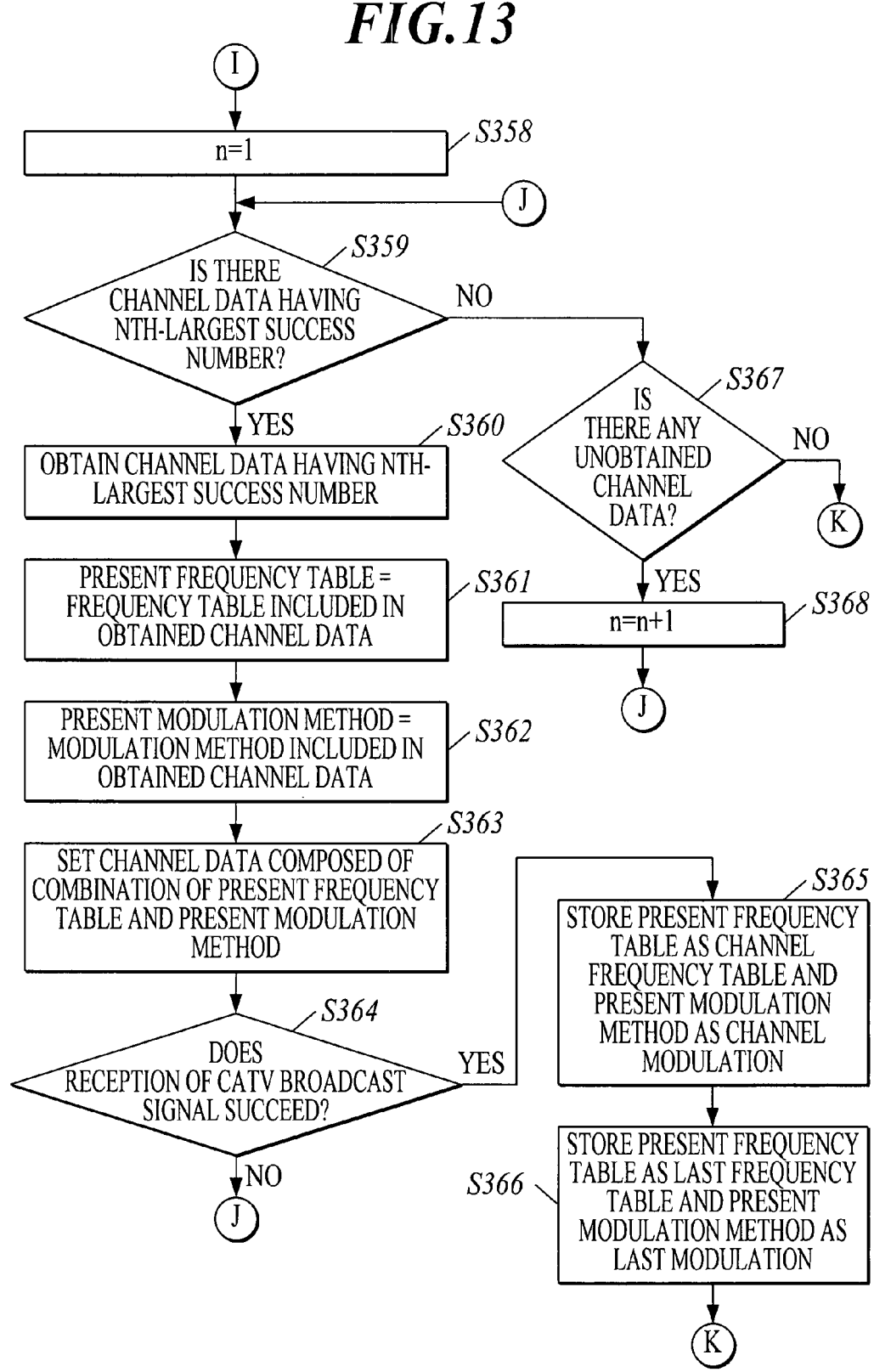
FIG. 13 is a flow chart for illustrating second processing pertaining to the modified example of the channel tuning by the television receiver according to the present invention.

Next, a modified example of the processing pertaining to the channel tuning by the television receiver 1 is described with reference to FIGS. 12 and 13.

First, when a channel is tuned in by, for example, a user's operation of the remote control R or the like (Step S351), the CPU 181 executes the normal operation program 1832 to obtain the channel data corresponding to the tuned channel from the "Channel Data" storage region 172c of the channel map 172 (Step S352).

Subsequently, the CPU 181 sets the frequency table included in the channel data obtained at the Step S352 into the "present frequency table" storage region in the RAM 182 (Step S353), and sets the modulation method included in the channel data obtained at the Step S352 into the "present modulation method" storage region in the RAM 182 (Step S354).

Subsequently, the CPU 181 sets the channel data composed of the combination of the frequency table set in the "present frequency table" storage region and the modulation method set in the "present modulation method" storage region into the tuner 12 and the front end 13 (Step S355), and judges whether the tuner 12 has succeeded in the reception of the CATV broadcast signal or not (Step S356).

When the CPU 181 judges that the tuner 12 has succeeded in the reception at the Step S356 (Step S356; Yes), the CPU 181 stores the frequency table set in the "present frequency table" storage region as the last frequency table and the modulation method set in the "present modulation method" storage region as the last modulation (Step S357), and ends the present processing.

Moreover, when the CPU 181 judges that the tuner 12 has failed in the reception at the Step S356 (Step S356; No), the CPU 181 sets "1" in an "n" storage region in the RAM 182 (Step S358).

Subsequently, the CPU 181 judges whether or not there is the channel data having an $n^{th}$-largest success number stored in the "Success Number" storage region 173b of the success number data table 173 among the channel data that has not been obtained yet (Step S359).

When the CPU 181 judges that there is the channel data having the $n^{th}$-largest success number at the Step S359 (Step S359; Yes), the CPU 181 obtains the channel data having the $n^{th}$-largest success number from the "success channel data" storage region 173a of the success number data table 173 (Step S360). In addition, if there is a plurality of the channel data having the $n^{th}$-largest success number, the CPU 181 obtains one of them.

Subsequently, the CPU 181 sets the frequency table included in the channel data obtained at the Step S360 into the "present frequency table" storage region in the RAM 182 (Step S361), and sets the modulation method included in the channel data obtained at the Step S360 into the "present modulation method" storage region in the RAM 182 (Step S362).

Subsequently, the CPU 181 sets the channel data composed of the combination of the frequency table set in the "present frequency table" storage region and the modulation method set in the "present modulation method" storage region into the tuner 12 and the front end 13 (Step S363), and the CPU 181 judges whether the tuner 12 has succeeded in the reception of the CATV broadcast signal or not (Step S364).

When the CPU 181 judges that the tuner 12 has failed in the reception at the Step S364 (Step S364; No), the processing of the CPU 181 moves to that at the Step S359.

On the other hand, when the CPU 181 judges that the tuner 12 has succeeded in the reception at the Step S364 (Step S364; Yes), the CPU 181 stores the frequency table set in the "present frequency table" storage region as the channel frequency table and the modulation method set in the "present modulation method" storage region as the channel modulation (Step S365).

Subsequently, the CPU 181 stores the frequency table set in the "present frequency table" storage region as the last frequency table and the modulation method set in the "present modulation method" storage region as the last modulation (Step S366), and ends the present processing.

Moreover, when the CPU 181 judges that there is not the channel data having the $n^{th}$-largest success number at the Step S359 (Step S359; No), the CPU 181 judges whether or not there is any channel data that has not been obtained yet (Step S367).

When the CPU 181 judges that there is the channel data that has not been obtained yet at the Step S367 (Step S367; Yes), the CPU 181 sets "n+1" in the "n" storage region in the RAM 182 (Step S368), and the processing of the CPU 181 moves to that at the Step S359.

On the other hand, when the CPU 181 judges that there is no channel data that has not been obtained yet at the Step S367 (Step S367; No), the CPU 181 ends the present processing.

[Re-Channel Scan Processing]

Figure 14:
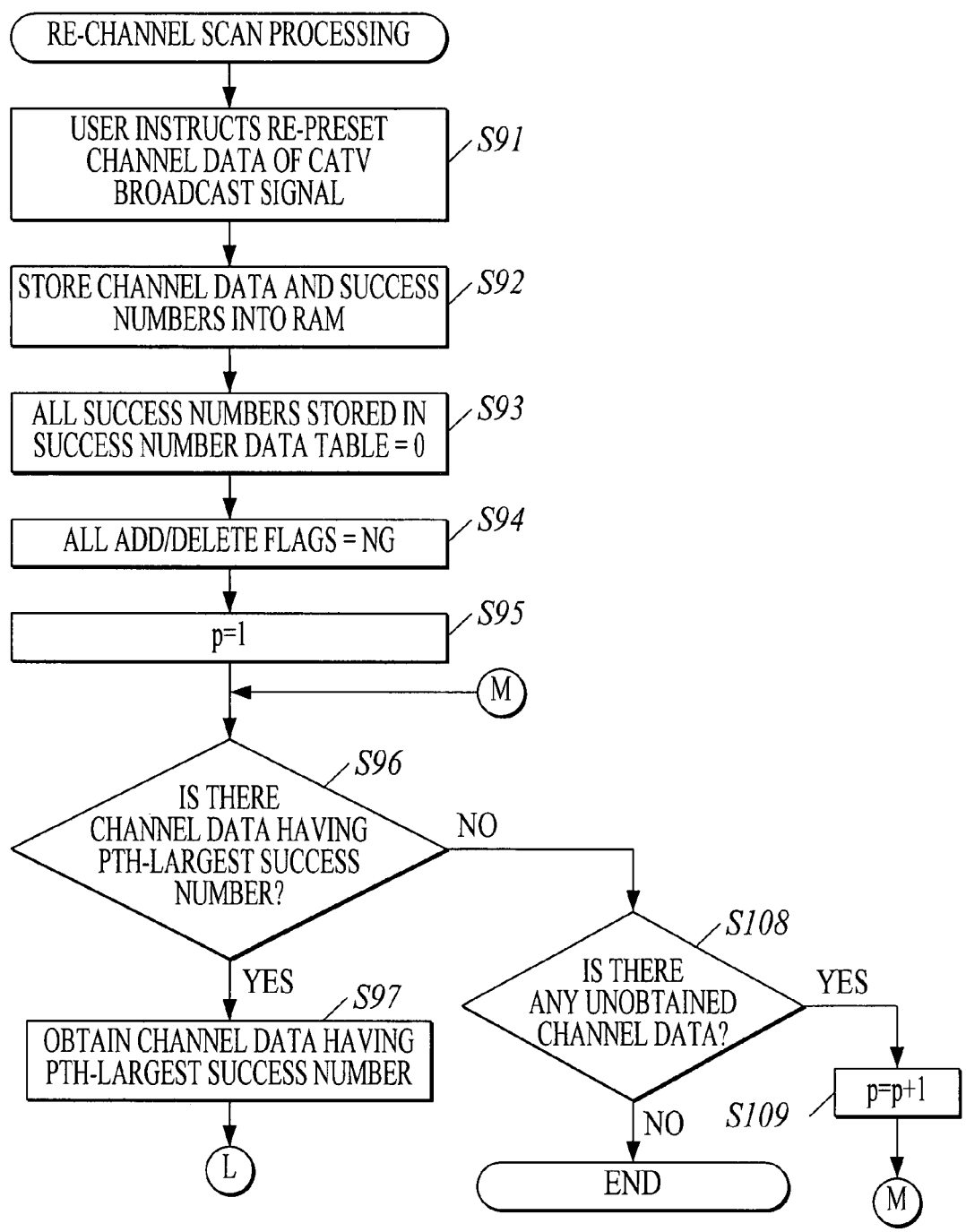
FIG. 14 is a flow chart for illustrating first processing pertaining to a re-channel scan by the television receiver according to the present invention.
Figure 15:
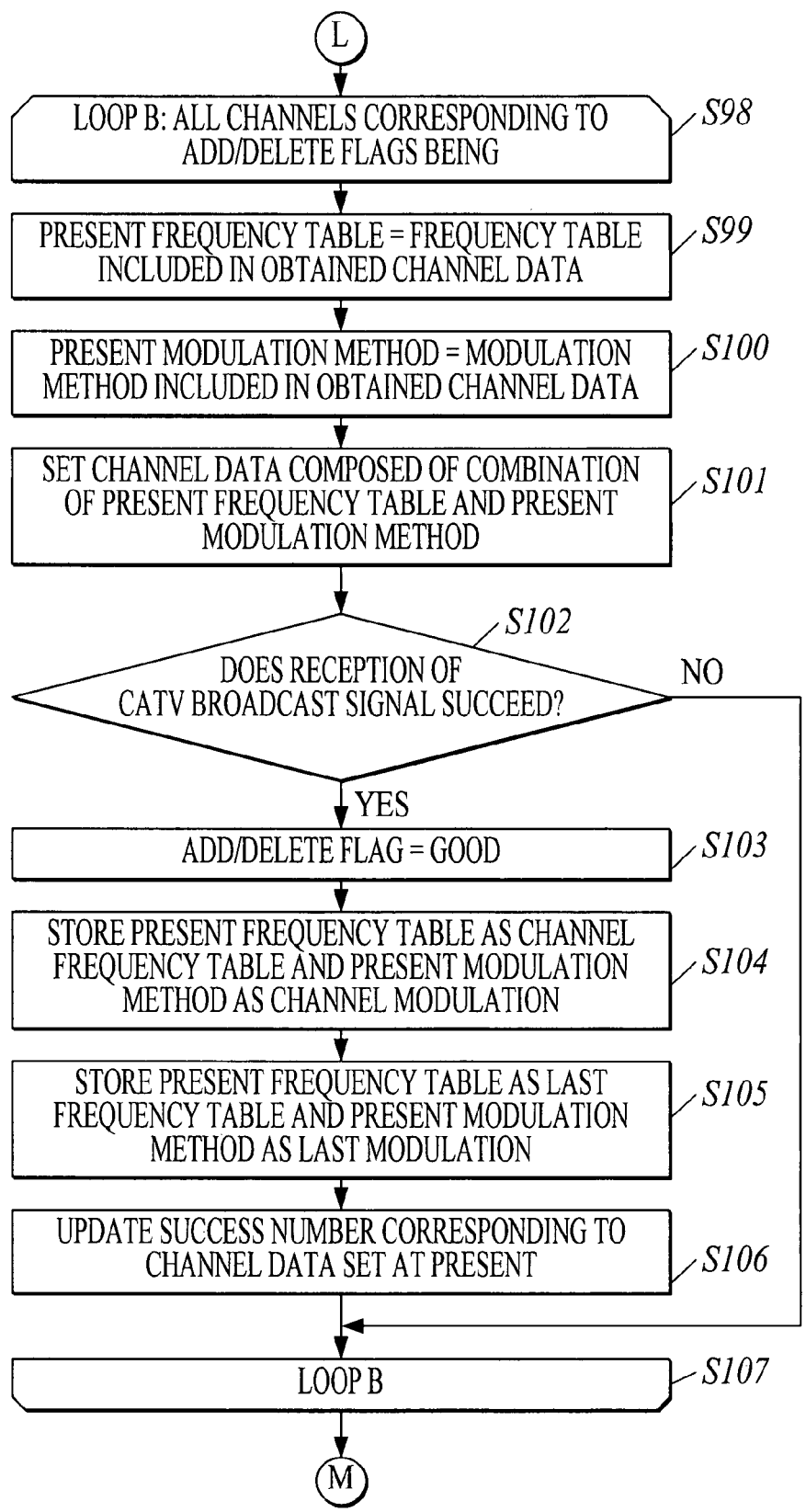
FIG. 15 is a flow chart for illustrating second processing pertaining to the re-channel scan by the television receiver according to the present invention.

Next, the processing pertaining to a re-channel scan by the television receiver 1 is described with reference to FIGS. 14 and 15.

First, when the television receiver 1 is instructed to perform the re-presetting of the channel data of a CATV broadcast signal, for example, by performing the auto scan of channels by a user's operation of the remote control R or the like (Step S91), the CPU 181 stores the "Cable" in the "Terrestrial/Cable Discrimination Flag" storage region 171b of the last channel data table 171, and stores the channel data and the success numbers that are stored in the success number data table 173 into the RAM 182 in association with each other (Step S92), and further stores "0" in each column of the "Success Number" storage region 173b of the success number data table 173 (Step S93).

Subsequently, the CPU 181 stores "NG" into each column of the "Add/Delete Flag" storage region 172b of the channel map 172 (Step S94), and sets "1" in a "p" storage region in the RAM 182 (Step S95).

Subsequently, the CPU 181 judges whether or not there is the channel data having a $p^{th}$-largest success number stored in the RAM 182 among the channel data that has not been obtained yet (Step S96).

When the CPU 181 judges that there is the channel data having the $p^{th}$-largest success number at the Step S96 (Step S96; Yes), the CPU 181 obtains the channel data having the $p^{th}$-largest success number from the RAM 182 (Step S97). In addition, if there is a plurality of the channel data having the $p^{th}$-largest success number, the CPU 181 obtains one of them.

Subsequently, the CPU 181 performs the processing of loop B to all the channels which can be received by the television receiver 1 and the columns of the "Add/Delete Flag" storage region 172b of the channel map 172 corresponding to which store "NG" (Steps S98-S107).

To put it concretely, in the processing of the loop B to a channel, the CPU 181 first sets the frequency table included in the channel data obtained at the Step S97 into the "present frequency table" storage region in the RAM 182 (Step S99), and sets the modulation method included in the channel data obtained at the Step S97 into the "present modulation method" storage region in the RAM 182 (Step S100).

Subsequently, the CPU 181 sets the channel data composed of the combination of the frequency table set in the "present frequency table" storage region and the modulation method set in the "present modulation method" storage region into the tuner 12 and the front end 13 (Step S101), and judges whether the tuner 12 has succeeded in the reception of the CATV broadcast signal or not (Step S102).

When the CPU 181 judges that the tuner 12 has failed in the reception at the Step S102 (Step S102; No), the processing of the CPU 181 moves to that at a Step S107 (which will be described later).

On the other hand, when the CPU 181 judges that the tuner 12 has succeeded in the reception at the Step S102 (Step S102; Yes), the CPU 181 stores "GOOD" into the region corresponding to the channel in the "Add/Delete Flag" storage region 172b of the channel map 172 (Step S103).

Subsequently, the CPU 181 stores the frequency table set in the "present frequency table" storage region as the channel frequency table and the modulation method set in the "present modulation method" storage region as the channel modulation (Step S104). Then, the CPU 181 stores the frequency table set in the "present frequency table" storage region as the last frequency table and the modulation method set in the "present modulation method" storage region as the last modulation (Step S105).

Subsequently, the CPU 181 updates the success number corresponding to the presently set channel data (namely, the channel data composed of the combination of the frequency table set in the "present frequency table" storage region and the modulation method set in the "present modulation method" storage region) (Step S106).

Then, when the processing of the loop B has ended to all channels which can be received by the television receiver 1 and in the corresponding "Add/Delete Flag" storage region 172b of the channel map 172 of each of which "NG" is stored (Step S107), the processing of the CPU 181 moves to that at the Step S96.

Moreover, when the CPU 181 judges that there is not the channel data having the $p^{th}$-largest success number at the Step S96 (Step S96; No), the CPU 181 judges whether or not there is any channel data that has not been obtained yet (Step S108).

When the CPU 181 judges that there is the channel data that has not been obtained yet at the Step S108 (Step S108; Yes), the CPU 181 sets "p+1" in the "p" storage region in the RAM 182 (Step S109), and repeatedly performs the processing at and after the Step S96.

On the other hand, when the CPU 181 judges that there is no channel data that has not been obtained yet at the Step S108 (Step S108; No), the CPU 181 ends the present processing.

According to the television receiver 1 of the present invention described above, the tuner 12 enables to receive the CATV broadcast signal, and the last channel data table 171 enables to store the frequency table of the CATV broadcast signal received by the tuner 12 in the channel that has been tuned in just before. The channel map 172 enables to store the modulation method of the CATV broadcast signal received by the tuner 12 in each channel obtained by an auto scan (channel scan processing), and the CPU 181 that has executed the normal operation program 1832 enables to set the channel data composed of the combination of the frequency table stored in the last channel data table 171 and the modulation method that is stored in the channel map 172 and corresponds to a tuned channel as the channel data of the CATV broadcast signal corresponding to the tuned channel to make the tuner 12 receive the CATV broadcast signal corresponding to the tuned channel when the channel is tuned in by a user's operation of the remote control R or the like. Then, the CPU 181 that has executed the normal operation program 1832 can judge whether the tuner 12 has succeeded in the reception of the CATV broadcast signal or not by setting the channel data composed of the combination of the frequency table stored in the last channel data table 171 and the modulation method that is stored in the channel map 172 and corresponds to the tuned channel. When the CPU 181 judges that the tuner 12 has not succeeded in the reception of the CATV broadcast signal, the CPU 181 sequentially changes the channel data to be set in the previously determined order to make the tuner 12 receive the CATV broadcast signal corresponding to the tuned channel. Subsequently, when the CPU 181 judges that the tuner 12 has succeeded in the reception of the CATV broadcast signal, the CPU 181 can update the frequency table stored in the last channel data table 171 and the modulation method that is stored in the channel map 172 and corresponds to the tuned channel to the frequency table and the modulation method that are included in the channel data set at the time of the success, respectively.

That is, when the tuner 12 has not succeeded in the reception of the CATV broadcast signal, the CPU 181 can change the channel data to be set in the previously determined order (for example, the order of the frequency tables and the order of the modulation methods that are most frequently adopted in the CATV broadcasting) by setting the channel data composed of the combination of the frequency table stored in the last channel data table 171 and the modulation method stored in the channel map 172. Consequently, the channel data of a TV broadcast signal of the CATV digital broadcasting can be surely and rapidly determined.

Moreover, the success number data table 173 enables to store the success number of the reception of the CATV broadcast signals to each channel data. Then, the CPU 181 that has executed the normal operation program 1832 can change and set the channel data in the descending order from the channel data having the largest success number stored in the success number data table 173.

That is, because the previously determined order is the descending order from the channel data having the largest success number, the channel data of the TV broadcast signal of the CATV digital broadcasting can be more surely and rapidly determined.

Moreover, the CPU 181 that has executed the auto scan program 1831 enables to perform the setting of the channel data composed of the combination of the frequency table and the modulation method of the CATV broadcast signal received by the tuner 12 to each channel at a predetermined timing, and the last channel data table 171 enables to store the channel data composed of the combination of the frequency table and the modulation method of the CATV broadcast signal received by the tuner 12 in the channel tuned in just before at the time of an auto scan by the CPU 181 that has executed the auto scan program 1831. Then, the CPU 181 that has executed the auto scan program 1831 can set the channel data stored in the last channel data table 171 as the channel data of the CATV broadcast signal corresponding to a tuned channel when the channel is tuned in by the CPU 181 that has executed the auto scan program 1831, and thereby can make the tuner 12 receive the CATV broadcast signal corresponding to the tuned channel.

That is, because the frequency bands of adjoining channels adjoin each other without any gaps, the channel data of the CATV broadcast signal corresponding to a tuned channel can be set by using the fact that the probability that the channel data composed of the combination of the frequency table and the modulation method of the CATV broadcast signal corresponding to a channel and the channel data composed of the combination of the frequency table and the modulation method of the CATV broadcast signal corresponding to another channel adjoining the former channel are the same is high. Consequently, the channel data of a TV broadcast signal of the CATV digital broadcasting can be surely and rapidly determined.

Moreover, the CPU 181 that has executed the auto scan program 1831 judges whether the tuner 12 has succeeded in the reception of a CATV broadcast signal or not by setting the channel data stored in the last channel data table 171. When the CPU 181 judges that the tuner 12 has not succeeded in the reception of the CATV broadcast signal, the CPU 181 sequentially changes the channel data to be set in the previously determined order to make the tuner 12 receive the CATV broadcast signal corresponding to the tuned channel. Subsequently, when the CPU 181 judges that the tuner 12 has succeeded in the reception of the CATV broadcast signal, the CPU 181 can update the channel data stored in the last channel data table 171 to the channel data set at the time of the success.

That is, when the tuner 12 has not succeeded in the reception of the CATV broadcast signal, the CPU 181 can change the channel data to be set in the previously determined order (for example, the order of the frequency table and the order of the modulation method that are most frequently adopted in the CATV broadcasting) by setting the channel data stored in the last channel data table 171. Consequently, even when the channel data of the CATV broadcast signals corresponding to adjoining channels are not the same, the channel data of the TV broadcast signals of the CATV digital broadcasting can be surely and rapidly determined.

Moreover, in re-channel scan processing, because all the channels are sequentially scanned in the descending order from the channel data having the largest success number of the reception of the CATV broadcast signals at the time of the last channel scan processing, it is unnecessary to perform the change of channel data to each channel, and consequently the channel scan can be more efficiently performed.

In addition, the present invention is not limited to the embodiment described above, but the invention can be suitably changed without departing from the spirit thereof.

The channels that the television receiver 1 can receive are not limited to the 1-135 channels. For example, according to the channel plan of the EIA/CEA-542-A standard, the range of physical channels is 1-158 channels.

When the CPU 181 that has executed the auto scan program 1831 judges that the tuner 12 has not succeeded in the reception of any CATV broadcast signals, the CPU 181 is designed to sequentially change the channel data to be set in the previously determined order (for example, the order of the frequency tables and the order of the modulation methods that are most frequently adopted in the CATV broadcasting). But, the previously determined order is not only the exemplified one, but also, for example, may be the descending order of the channel data from that having the largest success number stored in the "Success Number" storage region 173*b* of the success number data table 173.

The "Channel Data" storage region 172*c* of the channel map 172 may at least have the "Channel Modulation" storage region.

The present U.S. patent application claims a priority under the Paris Convention of Japanese patent application No. 2006-027084 filed on Feb. 3, 2006, and shall be a basis of correction of an incorrect translation.

What is claimed is:

1. A television receiver comprising:
 a reception unit to receive a cable television broadcast signal of a digital system;

a demodulator to demodulate the cable television broadcast signal output from the reception unit and to output a demodulated cable television broadcast signal;

an auto scan unit to perform setting channel data composed of a combination of a frequency table and a modulation method of the cable television broadcast signal received by the reception unit for each channel at a predetermined timing;

an auto scan storage unit to store the channel data composed of the combination of the frequency table and the modulation method of the cable television broadcast signal received by the reception unit of a channel most recently tuned during an auto scan of the auto scan unit;

a success number storage unit to store a success number of reception of cable television broadcast signals for each combination of the frequency table and the modulation method;

a first reception control unit to set the channel data stored in the auto scan storage unit as channel data of a cable television broadcast signal when one channel is tuned in by the auto scan unit, the cable television broadcast signal corresponding to the one tuned channel, to make the reception unit receive the cable television broadcast signal corresponding to the one tuned channel, and to judge whether reception of the cable television broadcast signal has succeeded or not based on whether the demodulated cable television broadcast signal has been output from the demodulator or not, the first reception control unit changing the combination of the frequency table and the modulation method to be set in a descending order of the success number stored in the success number storage unit to make the reception unit receive the cable television broadcast signal corresponding to the one tuned channel when the first reception control unit judges that the reception of the cable television broadcast signal has not succeeded, the first reception control unit updating the channel data stored in the auto scan storage unit to channel data set at a time of a success when the first reception control unit judges that the reception of the cable television broadcast signal has succeeded;

a tuning unit to tune in the one tuned channel;

a first storage unit to store the frequency table of the cable television broadcast signal of a channel most recently tuned by the tuning unit;

a second storage unit to store the modulation method of the cable television broadcast signal received by the reception unit of each channel obtained by the auto scan unit; and a second reception control unit to set channel data composed of a combination of the frequency table stored in the first storage unit and the modulation method stored in the second storage unit, the modulation method corresponding to the one tuned channel, as the channel data of the cable television broadcast signal corresponding to the one tuned channel, when the one tuned channel is tuned in by the tuning unit, to make the reception unit receive the cable television broadcast signal corresponding to the one tuned channel, the second reception control unit judging whether the reception of the cable television broadcast signal has succeeded or not based on whether the demodulated cable television broadcast signal has been output from the demodulator or not, the second reception control unit changing the combination of the frequency table and the modulation method to be set in the descending order of the success number stored in the success number storage unit to make the reception unit receive the cable television broadcast signal corresponding to the one tuned channel when the second reception control unit judges that the reception of the cable television broadcast signal has not succeeded, and the second reception control unit updating the frequency table stored in the first storage unit and the modulation method stored in the second storage unit, the modulation method corresponding to the one tuned channel, to the frequency table and the modulation method that are included in the channel data set at the time of the success, respectively, when the second reception control unit judges that the reception of the cable television broadcast signal has succeeded.

2. A television receiver comprising:

a reception unit to receive a cable television broadcast signal of a digital system;

a demodulator to demodulate the cable television broadcast signal output from the reception unit and to output a demodulated cable television broadcast signal;

a tuning unit to tune in one channel;

an auto scan unit to perform setting channel data composed of a combination of a frequency table and a modulation method of the cable television broadcast signal received by the reception unit for each channel at a predetermined timing;

a first storage unit to store a frequency table of the cable television broadcast signal of a channel most recently tuned by the tuning unit;

a second storage unit to store a modulation method of the cable television broadcast signal received by the reception unit in each of channels obtained by auto scans performed by the auto scan unit;

a reception control unit to set channel data composed of a combination of the frequency table stored in the first storage unit and the modulation method stored in the second storage unit, the modulation method corresponding to the one tuned channel, as channel data of a cable television broadcast signal corresponding to the one tuned channel, when the one tuned channel is tuned in by the tuning unit, and to make the reception unit receive the cable television broadcast signal corresponding to the one tuned channel; and a success number storage unit to store a success number of reception of cable television broadcast signals for each combination of the frequency table and the modulation method;

wherein the reception control unit judges whether reception of the cable television broadcast signal has succeeded or not based on whether the demodulated cable television broadcast signal has been output from the demodulator or not, the reception control unit changes the combination of the frequency table and the modulation method to be set in a descending order of the success number stored in the success number storage unit to make the reception unit receive the cable television broadcast signal corresponding to the one tuned channel when the reception control unit judges that the reception of the cable television broadcast signal has not succeeded, and the reception control unit updates the frequency table stored in the first storage unit and the modulation method stored in the second storage unit, the modulation method corresponding to the one tuned channel, to the frequency table and the modulation method that are included in the channel data set at a time of the success, respectively, when the reception control unit judges that the reception of the cable television broadcast signal has succeeded.

3. A television receiver comprising:
- a reception unit to receive a cable television broadcast signal of a digital system;
- a demodulator to demodulate the cable television broadcast signal output from the reception unit and to output a demodulated cable television broadcast signal;
- a tuning unit to tune in one channel;
- an auto scan unit to perform setting channel data composed of a combination of a frequency table and a modulation method of the cable television broadcast signal received by the reception unit for each channel at a predetermined timing;
- an auto scan storage unit to store the channel data composed of the combination of the frequency table and the modulation method of the cable television broadcast signal received by the reception unit of a channel most recently tuned during an auto scan of the auto scan unit; and
- a success number storage unit to store a success number of reception of cable television broadcast signals for each combination of the frequency table and the modulation method, wherein the auto scan unit is provided with an auto scan reception control unit to set the channel data stored in the auto scan storage unit as channel data of a cable television broadcast signal corresponding to the one tuned channel to make the reception unit receive the cable television broadcast signal corresponding to the one tuned channel, when the one tuned channel is tuned in, wherein the auto scan reception control unit judges whether reception of the cable television broadcast signal has succeeded or not based on whether the demodulated cable television broadcast signal has been output from the demodulator or not, the auto scan reception control unit changing the combination of the frequency table and the modulation method to be set in a descending order of the success number store in the success number storage unit to make the reception unit receive the cable television broadcast signal corresponding to the one tuned channel when the auto scan reception control unit judges that the reception of the cable television broadcast signal has not succeeded, the auto scan reception control unit updating the channel data stored in the auto scan storage unit to channel data set at a time of a success when the auto scan reception control unit judges that the reception of the cable television broadcast signal has succeeded.

4. A channel tuning method of a television receiver, the method comprising the steps of:
- tuning in one tuned channel with a tuning unit;
- setting channel data composed of a combination of a frequency table stored in a first storage unit and a modulation method stored in a second storage unit, the modulation method corresponding to the one tuned channel, as channel data of a cable television broadcast signal corresponding to the one tuned channel to make a reception unit receive a cable television broadcast signal corresponding to the one tuned channel with a reception control unit, when the one tuned channel is tuned in at the step of tuning in the channel;
- judging whether reception of the cable television broadcast signal has succeeded or not at the step of setting the channel data with the reception control unit;
- sequentially changing a combination of the frequency table and the modulation method to be set in a descending order of a success number stored in a success number storage unit to make the reception unit receive the cable television broadcast signal corresponding to the one tuned channel with the reception control unit when the reception of the cable television broadcast signal is judged not to have succeeded at the step of judging success of the reception;
- judging whether the reception of the cable television broadcast signal has succeeded or not with the reception control unit at the step of sequentially changing the combination of the frequency table and the modulation method; and
- updating the frequency table stored in the first storage unit and the modulation method stored in the second storage unit, the modulation method corresponding to the one tuned channel, to a frequency table and a modulation method that are included in the channel data set at the success, respectively, when the reception of the cable television broadcast signal is judged to have succeeded at the step of second judging of the success of the reception.

5. A channel scan method of a television receiver, the method comprising the steps of:
- setting channel data stored in an auto scan storage unit and composed of a combination of a frequency table and a modulation method of a cable television broadcast signal received by a reception unit for each channel at a predetermined timing as channel data of the cable television broadcast signal corresponding to one tuned channel to make the reception unit receive the cable television broadcast signal corresponding to the one tuned channel with an auto scan reception control unit, when the one tuned channel is tuned in by the auto scan reception control unit during an auto scan;
- judging whether reception of the cable television broadcast signal has succeeded or not with the auto scan reception control unit at the step of setting the channel data;
- sequentially changing the combination of the frequency table and the modulation method to be set in a descending order of a success number stored in a success number storage unit to make the reception unit receive the cable television broadcast signal corresponding to the one tuned channel with the auto scan reception control unit when the reception of the cable television broadcast signal is judged not to have succeeded at the step of judging the success of the reception;
- judging whether the reception of the cable television broadcast signal has succeeded or not with the auto scan reception control unit at the step of sequentially changing the combination of the frequency table and the modulation method; and
- updating the channel data stored in the auto scan storage unit to channel data set at the success with the auto scan reception control unit when the reception of the cable television broadcast signal is judged to have succeeded at the step of the second judging of the success of the reception.

* * * * *